United States Patent
D'Alessandro et al.

(10) Patent No.: US 12,260,387 B2
(45) Date of Patent: Mar. 25, 2025

(54) AUTOMATED DECISIONING BASED ON PREDICTED USER INTENT

(71) Applicant: LIVEPERSON, INC., New York, NY (US)

(72) Inventors: Angelo D'Alessandro, Studio City, CA (US); Brian Haley, New York, NY (US)

(73) Assignee: LIVEPERSON, INC., New York, NY (US)

(*) Notice: Subject to any disclaimer, the term of this patent is extended or adjusted under 35 U.S.C. 154(b) by 0 days.

(21) Appl. No.: 17/979,351

(22) Filed: Nov. 2, 2022

(65) Prior Publication Data
US 2023/0134392 A1 May 4, 2023

Related U.S. Application Data

(60) Provisional application No. 63/274,689, filed on Nov. 2, 2021.

(51) Int. Cl.
*G06Q 40/00* (2023.01)
*G06N 20/00* (2019.01)
*G06Q 20/22* (2012.01)

(52) U.S. Cl.
CPC .............. *G06Q 20/22* (2013.01); *G06N 20/00* (2019.01)

(58) Field of Classification Search
CPC .............................. G06Q 20/22; G06N 20/00
See application file for complete search history.

(56) References Cited

U.S. PATENT DOCUMENTS

| 11,651,158 B2 * | 5/2023 | Yang | G06N 3/04 |
| | | | 704/270.1 |
| 11,853,362 B2 * | 12/2023 | Rosset | G06F 18/24 |
| 2014/0180811 A1 * | 6/2014 | Boal | G06Q 20/209 |
| | | | 705/14.53 |
| 2018/0276710 A1 | 9/2018 | Tietzen et al. | |

(Continued)

FOREIGN PATENT DOCUMENTS

| EP | 2902950 A1 * | 8/2015 | ....... G06Q 10/06375 |
| WO | WO-2006043925 A1 * | 4/2006 | .............. G06F 3/011 |
| WO | WO-2016084074 A1 * | 6/2016 | ......... G06Q 10/0639 |

OTHER PUBLICATIONS

Adrian Bridgwater, "IBM Watson Gets Smarter, Artificial Intelligence, Vision and Speech," Forbes, 2015 (Year: 2015).*

(Continued)

*Primary Examiner* — Abhishek Vyas
*Assistant Examiner* — William B. Bunker
(74) *Attorney, Agent, or Firm* — POLSINELLI LLP

(57) ABSTRACT

A system for automated account interaction receives historical information associated with an account corresponding to a user. The historical information identifies a transaction involving the account. The system uses one or more trained machine learning models to identify an intent for the transaction at least in part by inputting the historical information to the trained machine learning models. The system uses the trained machine learning models to generate a recommended transaction at least in part by inputting the intent for the transaction to the trained machine learning models. The system outputs the recommended transaction and receives a confirmation regarding the recommended transaction.

87 Claims, 18 Drawing Sheets

(56) References Cited

U.S. PATENT DOCUMENTS

| | | | |
|---|---|---|---|
| 2018/0322403 A1* | 11/2018 | Ron | G06Q 10/107 |
| 2019/0057387 A1* | 2/2019 | Ahuja | G06Q 20/40145 |
| 2019/0130285 A1* | 5/2019 | Snyder | G06Q 30/0641 |
| 2019/0214024 A1 | 7/2019 | Gruber et al. | |
| 2020/0097981 A1* | 3/2020 | Teo | H04M 3/42144 |
| 2020/0184307 A1* | 6/2020 | Lipka | G06N 3/02 |
| 2020/0226180 A1* | 7/2020 | Freed | G06F 16/90348 |
| 2020/0242669 A1* | 7/2020 | Carroll | G06N 20/00 |
| 2020/0274969 A1* | 8/2020 | Dunn | H04M 3/4933 |
| 2021/0065019 A1* | 3/2021 | Alkan | G06N 20/00 |
| 2021/0166318 A1* | 6/2021 | Tang | G06Q 40/06 |
| 2021/0304284 A1* | 9/2021 | Ben David | G06F 40/30 |
| 2021/0358027 A1* | 11/2021 | Poilil | G06Q 10/109 |
| 2022/0012954 A1* | 1/2022 | Buharin | G06T 15/00 |
| 2022/0036450 A1* | 2/2022 | Sanghvi | G06N 5/043 |
| 2022/0309507 A1* | 9/2022 | Ross | G06N 7/01 |
| 2022/0398656 A1* | 12/2022 | Anand | G06N 20/00 |
| 2023/0036167 A1* | 2/2023 | Yusuf | G06Q 10/02 |
| 2024/0127259 A1* | 4/2024 | Geng | G06F 40/35 |

OTHER PUBLICATIONS

Lin et al., "Hybrid Real-Time Matrix Factorization for Implicit Feedback Recommendation Systems," IEEE Access, vol. 6 2018 (Year: 2018).*

Hsu et al., "An Intelligent Transaction Assistant System for Electronic Commerce to Recommend Personalized Transaction Behavior," Proceedings of the Sixth International Conference on Machine Learning and Cybernetics, 2007 (Year: 2007).*

International Search Report and Written Opinion of Feb. 6, 2023 for PCT Application No. PCT/US2022/048685, 10 pages.

* cited by examiner

AUTOMATED DECISIONING BASED ON PREDICTED USER INTENT

CROSS-REFERENCE TO RELATED APPLICATIONS

This application claims the benefit of U.S. Provisional Application No. 63/274,689, filed Nov. 2, 2021, which is hereby incorporated by reference in its entirety for all purposes.

DESCRIPTION OF THE RELATED TECHNOLOGY

People engage in transactions with a variety of entities throughout their day-to-day lives. For instance, people engage with merchants to purchase products, with service providers to receive services, with financial institutions such as banks and credit unions and lenders for financial services, and the like. Traditionally, information related to such transactions has remained siloed at the individual entities with which a person engages. Further, a person may at times engage in the same or similar types of transactions with the same entity or similar entities periodically in a pattern. Such patterns of transactions are typically inefficient and cumbersome for the person to maintain, and may result in problems for the person if the person forgets a transaction in the pattern.

SUMMARY

Disclosed are systems, apparatuses, methods, computer readable medium, and circuitry for automated account interaction. In some examples, a system for automated account interaction receives historical information associated with an account corresponding to a user. The historical information identifies at least one transaction involving the account. The historical information can include, for example, demographic data, transaction histories, credit histories, account histories of the account, characteristics of the user, actions performed by the user and/or using the user account, and the like. The system provides the historical information to one or more trained machine learning models. The system uses the one or more trained machine learning models to identify an intent for the transaction at least in part by inputting the historical information to the one or more trained machine learning models. The system provides the intent for the transaction to the one or more trained machine learning models. The system uses the trained machine learning models to generate a recommended transaction at least in part by inputting the intent for the transaction to the trained machine learning models. In some examples, the system uses the first trained machine learning engine to identify the intent for the transaction and uses a second trained machine learning engine to generate the recommended transaction. In some examples, the system uses a first trained machine learning engine both to identify the intent for the transaction and to generate the recommended transaction. The system outputs the recommended transaction. In some examples, the system outputs the recommended transaction by displaying the recommended transaction using a display. In some examples, the system outputs the recommended transaction by sending the recommended transaction to the user device associated with the user. In some examples, the system outputs the recommended transaction by initiating, processing, and/or completing the transaction. In some examples, the system outputs the recommended transaction by communicating with a second system to request that the second system that initiate, process, and/or complete the transaction. The system receives a confirmation regarding the recommended transaction. In some examples, the confirmation is approval from the user to initiate the recommended transaction. In response to the confirmation, the system can initiate, process, and/or complete the transaction. In response to the confirmation, the system can communicate with a second system to request that the second system initiate, process, and/or complete the transaction. In some examples, the confirmation is a confirmation received from a second system (or a component of the system) that confirms that the transaction has been initiated, processed, and/or completed. The system can output a message based on the confirmation, for instance by displaying the message using a display and/or sending the message to the user device associated with the user.

In one example, a method for automated account interaction is provided. The method includes: receiving historical information associated with a first account corresponding to a first user, wherein the historical information identifies a transaction involving the first account; using one or more trained machine learning models to identify an intent for the transaction at least in part by inputting the historical information to the one or more trained machine learning models; using the one or more trained machine learning models to generate a recommended transaction at least in part by inputting the intent for the transaction to the one or more trained machine learning models; outputting the recommended transaction; receiving a confirmation regarding the recommended transaction; and based on the confirmation, using the intent and the recommended transaction to update the one or more trained machine learning models for use in identifying one or more additional intents and one or more additional recommended transactions.

In another example, a system for automated account interaction is provided. The system includes a storage (e.g., a memory configured to store data, such as virtual content data, one or more images, etc.) and one or more processors (e.g., implemented in circuitry) coupled to the memory and configured to execute instructions. Execution of the instructions by the one or more processors causes the one or more processors, in conjunction with various components (e.g., a network interface, a display, an output device, etc.), to: receive historical information associated with a first account corresponding to a first user, wherein the historical information identifies a transaction involving the first account; use one or more trained machine learning models to identify an intent for the transaction at least in part by inputting the historical information to the one or more trained machine learning models; use the one or more trained machine learning models to generate a recommended transaction at least in part by inputting the intent for the transaction to the one or more trained machine learning models; output the recommended transaction; receive a confirmation regarding the recommended transaction; and use, based on the confirmation, the intent and the recommended transaction to update the one or more trained machine learning models for use in identifying one or more additional intents and one or more additional recommended transactions.

In another example, a non-transitory computer readable storage medium having embodied thereon a program is provided. The program is executable by a processor to perform a method of automated account interaction. The method includes: receiving historical information associated with a first account corresponding to a first user, wherein the historical information identifies a transaction involving the first account; using one or more trained machine learning models to identify an intent for the transaction at least in part by inputting the historical information to the one or more trained machine learning models; using the one or more trained machine learning models to generate a recommended transaction at least in part by inputting the intent for the transaction to the one or more trained machine learning models; outputting the recommended transaction; receiving a confirmation regarding the recommended transaction; and based on the confirmation, using the intent and the recommended transaction to update the one or more trained machine learning models for use in identifying one or more additional intents and one or more additional recommended transactions.

In another example, a system for automated account interaction is provided. The system includes: means for receiving historical information associated with a first account corresponding to a first user, wherein the historical information identifies a transaction involving the first account; means for using one or more trained machine learning models to identify an intent for the transaction at least in part by inputting the historical information to the one or more trained machine learning models; means for using the one or more trained machine learning models to generate a recommended transaction at least in part by inputting the intent for the transaction to the one or more trained machine learning models; means for outputting the recommended transaction; means for receiving a confirmation regarding the recommended transaction; and means for using, based on the confirmation, the intent and the recommended transaction to update the one or more trained machine learning models for use in identifying one or more additional intents and one or more additional recommended transactions.

BRIEF DESCRIPTION OF THE DRAWINGS

Illustrative embodiments of the present application are described in detail below with reference to the following figures.

DETAILED DESCRIPTION

Figure 1:
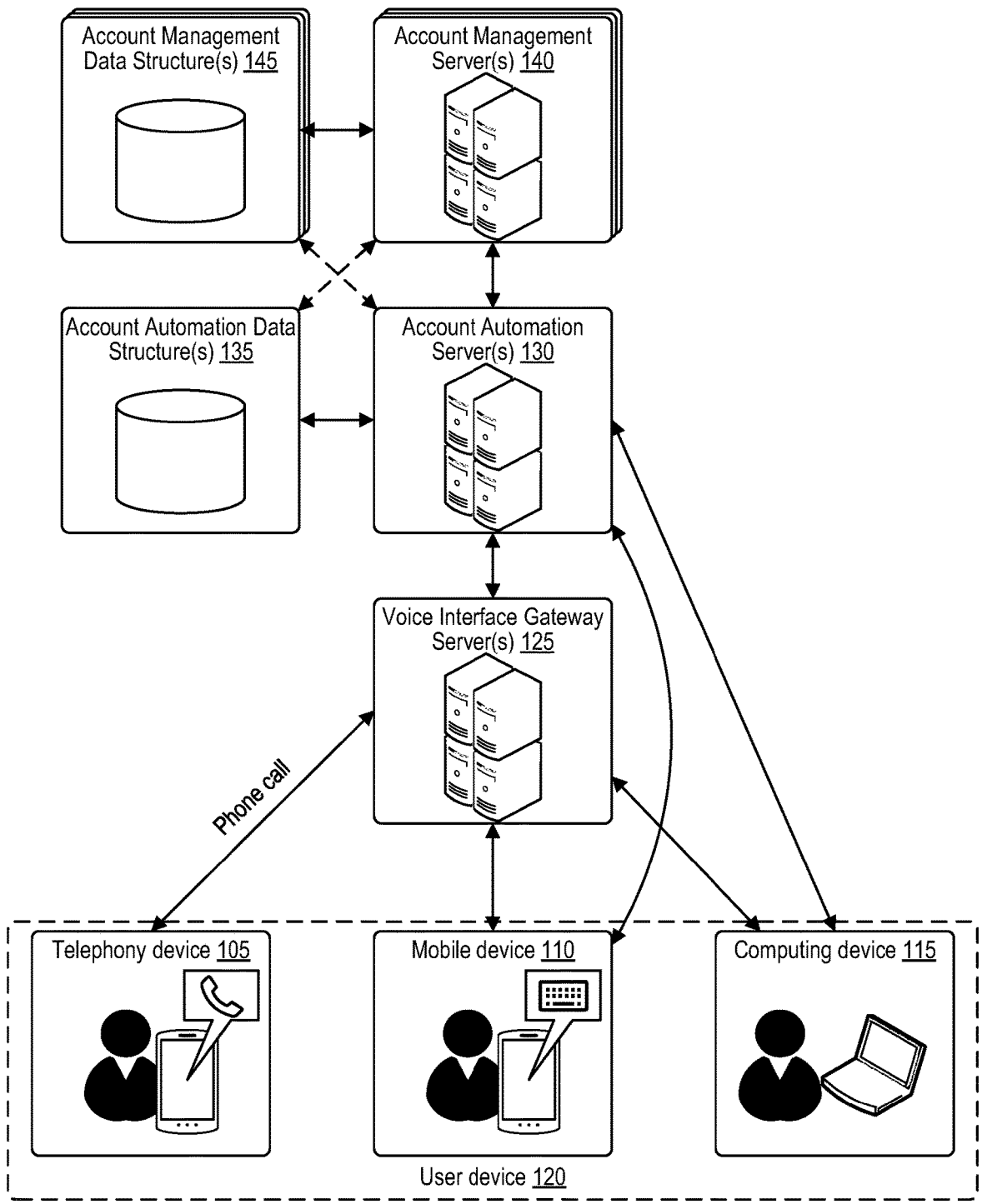
FIG. 1 is a block diagram illustrating a system architecture of a system for automated account interaction, in accordance with some examples.

People engage in transactions with a variety of entities throughout their day-to-day lives. For instance, people engage with merchants to purchase products, with service providers to receive services, with financial institutions such as banks and credit unions and lenders for financial services, and the like. Traditionally, information related to such transactions has remained siloed at the individual entities with which a person engages. Further, a person may at times engage in the same or similar types of transactions with the same entity or similar entities periodically in a pattern. Such patterns of transactions are typically inefficient and cumbersome for the person to maintain, and may result in problems for the person if the person forgets a transaction in the pattern.

Systems, apparatuses, methods, computer readable media, and circuitry are disclosed for automated account interaction. In some examples, a system for automated account interaction receives historical information associated with an account corresponding to a user. The historical information identifies at least one transaction involving the account. The historical information can identify a variety of transactions involving the user and/or the account, such as transactions with different entities (e.g., transactions with merchants to purchase products, with service providers to receive services, with financial institutions such as banks and credit unions and lenders for financial services, and the like). The historical information can include, for example, demographic data, transaction histories, credit histories, account histories of the account, characteristics of the user, actions performed by the user and/or using the user account, and the like.

In some examples, the system includes a machine learning (ML) engine with one or more ML models, which the system may train using training data. The system provides the historical information to at least one of the one or more trained ML models. The system uses the one or more trained ML models to identify an intent for the transaction at least in part by inputting the historical information to the one or more trained ML models. In some examples, the training data for the one or more ML models can include historical information and an intent for the transaction identified in the historical information. During a validation stage of training, the system can use the one or more ML models to generate a predicted intent for the transaction based on the historical information, and the system can update and/or further train the one or more ML models based on whether or not the predicted intent for the transaction matches the intent for the transaction from the training data. In some examples, the system requests and/or receives feedback from the user regarding the intent for the transaction, and updates and/or further trains the one or more ML models based on the feedback.

The system provides the intent for the transaction to the one or more trained ML models. The system uses the trained ML models to generate a recommended transaction at least in part by inputting the intent for the transaction to the trained ML models. In some examples, the training data for the one or more ML models can include historical information, an intent for the transaction identified in the historical information, and/or a second transaction performed by the user after the transaction identified in the historical information. The second transaction may be related to the intent and/or to the transaction identified in the historical information. During a validation stage of training, the system can use the one or more ML models to generate a recommended transaction based on the intent and/or based on the historical information, and the system can update and/or further train the one or more ML models based on whether or not the recommended transaction matches the second transaction from the training data. In some examples, the system uses the first trained ML engine to identify the intent for the transaction and uses a second trained ML engine to generate the recommended transaction. In some examples, the system uses a first trained ML engine both to identify the intent for the transaction and to generate the recommended transaction.

The system outputs the recommended transaction. In some examples, the system outputs the recommended transaction by displaying the recommended transaction using a display. In some examples, the system outputs the recommended transaction by sending the recommended transaction to the user device associated with the user. In some examples, the system outputs the recommended transaction by initiating, processing, and/or completing the transaction. In some examples, the system outputs the recommended transaction by communicating with a second system to request that the second system that initiate, process, and/or complete the transaction.

The system receives a confirmation regarding the recommended transaction. In some examples, the confirmation is approval from the user to initiate the recommended transaction. In response to the confirmation, the system can initiate, process, and/or complete the transaction. In response to the confirmation, the system can communicate with a second system to request that the second system initiate, process, and/or complete the transaction. In some examples, the confirmation is a confirmation received from a second system (or a component of the system) that confirms that the transaction has been initiated, processed, and/or completed. The system can output a message based on the confirmation, for instance by displaying the message using a display and/or sending the message to the user device associated with the user.

The system uses the intent and/or the recommended transaction to update the one or more machine learning models for use in identifying one or more additional intents and one or more additional recommended transactions. In some examples, the system requests and/or receives feedback from the user regarding the intent and/or recommended transaction, and updates and/or further trains the one or more ML models based on the feedback. For instance, if the feedback is positive, then the update to the ML models can reinforce weights and/or connections within the one or more ML models that contributed to the determination of the intent for the transaction and/or to the generation of the recommended transaction. If the feedback is negative, then the update can weaken, remove, and/or replace weights and/or connections within the one or more ML models that contributed to the determination of the intent for the transaction and/or to the generation of the recommended transaction.

The systems, apparatuses, methods, computer readable media, and circuitry for automated account interaction described herein provide a number of benefits over traditional account management technologies. For instance, the automated account interaction systems, apparatuses, methods, computer readable media, and circuitry described herein provide customized recommendations (e.g., recommended transactions) that are customized and/or tailored specifically to users based on their histories, their account information, intents determined behind their transaction(s), or combinations thereof. This improves over systems that are unable to provide recommendations, or provide standardized recommendations without such customization. The automated account interaction systems, apparatuses, methods, computer readable media, and circuitry described herein improve efficiency of account management, point of sale (POS), and financial management technologies, for instance by initiating, processing, and/or completing recommended transactions automatically based on intelligent predictions, forecasts, and/or estimates of transactions aligning with the user's intent, which the system determines based on prior transaction(s).

FIG. 1 is a block diagram illustrating a system architecture for automated account interaction. The system architecture includes various types of user devices 120. User devices 120 include telephony devices 105, such as landline telephones, cellular phones, smartphones, smart watches, mobile handsets, wearable devices, or combinations thereof. User devices 120 include computing devices 115 such as desktop computers, laptop computers, servers, terminals, kiosks, cellular phones, smartphones, smart watches, mobile handsets, wearable devices, or any other computing system 1500 discussed with respect to FIG. 15. User devices 120 include mobile devices 110, such as smartphones, cellular phones, mobile handsets, tablet devices, portable video game consoles, portable media players, head-mounted displays (HMDs), virtual reality (VR) devices, augmented reality (AR) devices, mixed reality (MR) devices, extended reality (XR) devices, smartwatches, smart glasses, smart rings, smart bracelets, wearable devices, health monitor devices, health tracking devices, fitness tracking devices, another type of computing system 1500, or a combination thereof. In some examples, a user device 120 may be a combination of a telephony device 105, mobile device 110, and/or computing device 115.

The system architecture includes one or more voice interface gateway servers 125, one or more account automation servers 130, one or more account management servers 140, one or more account automation data structures 135, and one or more account management data structures 145. In some cases, user device 120 may receive an input from a user of the user device 120. For example, the user device 120 may receive the input through an input interface, such as a physical keyboard or keypad with physical keys or buttons, a virtual keyboard or keypad with virtual keys or buttons on a touchscreen, another touchscreen interface, a microphone that records the user's voice, a touchpad, a mouse, any input device 1545 discussed with respect to FIG. 15, or some combination thereof.

If the input device used is a microphone of the user device 120, the microphone may record a voice recording of the user's voice. In some examples, the user device 120 sends the voice recording to the voice interface gateway servers 125. The voice interface gateway servers 125, upon receiving the voice recording, can convert the voice recording into a string of text using a conversion algorithm, which may be referred to as parsing the voice recording, automatic speech recognition (ASR), computer speech recognition (CSR), speech to text (STT), or a combination thereof. The voice interface gateway servers 125 can convert the voice recording into a string of text dynamically and/or in real-time as the voice interface gateway servers 125 continues to receive more of the user's voice. The conversion algorithm may convert the voice recording into the string of text using, for example, hidden Markov models, dynamic time warping (DTW)-based speech recognition, deep neural networks, deep feedforward neural networks (DNNs), recurrent neural networks (RNNs), time delay neural networks (TDNNs), convolutional neural networks (CNNs), denoising autoencoders, or combinations thereof.

In some examples, the user device 120 converts the voice recording into the string of text using the conversion algorithm. In some examples, the voice recording is converted into the string of text by a combination of the user device 120 and the voice interface gateway servers 125, for example with the different devices performing various operations of the conversion algorithm. For example, if the user device 120 engages in a phone call or voice-over-IP call with an automated assistant running on the voice interface gateway servers 125 and/or on the account automation servers 130, the user's voice may be sent from the user device 120 to the voice interface gateway servers 125 over telephone, cellular network, or internet network lines, and can be recorded during the phone call and temporarily stored by the voice interface gateway servers 125 while the voice recording is converted into the string of text. In some examples, the voice recording can be a request or statement to a virtual personal assistant whose speech recognition functionality runs at least partially on the user device 120 and/or at least partially on the voice interface gateway servers 125. Once the voice recording is converted into a string of text by the user device 120 and/or the voice interface gateway servers 125, the string of text is sent to the account automation servers 130 from the user device 120 and/or the voice interface gateway servers 125. The account automation servers 130 may then parse the string of text to determine the intent of the received input.

The one or more account automation servers 130 can obtain historical information about an account of a user from the one or more account management data structures 145 and/or from the one or more account automation data structures 135. The historical information identifies at least one transaction involving the account. The historical information can identify a variety of transactions involving the user and/or the account, such as transactions with different entities (e.g., transactions with merchants to purchase products, with service providers to receive services, with financial institutions such as banks and credit unions and lenders for financial services, and the like). The historical information can include, for example, demographic data, transaction histories, credit histories, account histories of the account, characteristics of the user, actions performed by the user and/or using the user account, and the like. In some examples, the one or more account automation servers 130 store the historical information in the account automation data structures 135.

The one or more account automation servers 130 can include a machine learning (ML) engine with one or more trained ML models. The one or more account automation servers 130 can use the ML engine to train the one or more ML models using training data. The one or more account automation servers 130 provide the historical information to at least one of the one or more trained ML models. The one or more account automation servers 130 use the one or more trained ML models to identify an intent for the transaction at least in part by inputting the historical information to the one or more trained ML models. In some examples, the one or more account automation servers 130 store the intent for the transactions in the account automation data structures 135.

In some examples, the training data for the one or more ML models can include historical information and an intent for the transaction identified in the historical information. During a validation stage of training, the one or more account automation servers 130 can use the one or more ML models to generate a predicted intent for the transaction based on the historical information, and the one or more account automation servers 130 can update and/or further train the one or more ML models based on whether or not the predicted intent for the transaction matches the intent for the transaction from the training data.

In some examples, the one or more account automation servers 130 request and/or receive feedback from the user device 120 associated with the user regarding the intent for the transaction. The one or more account automation servers 130 can update and/or further train the one or more ML models based on the feedback from the user device 120 associated with the user. For instance, if the feedback is positive (e.g., confirming, indicating, and/or suggesting that the intent for the transaction determined by the one or more ML models is accurate), then the one or more account automation servers 130 can reinforce weights and/or connections within the one or more ML models that contributed to the determination of the intent for the transaction. If the feedback is negative (e.g., indicating and/or suggesting that the intent for the transaction determined by the one or more ML models is inaccurate, and/or indicating and/or suggesting an alternate intent for the transaction that contradicts the intent for the transaction determined by the one or more ML models), then the one or more account automation servers 130 can weaken, remove, and/or replace weights and/or connections within the one or more ML models that contributed to the determination of the intent for the transaction.

The one or more account automation servers 130 provides the intent for the transaction to the one or more trained ML models. The one or more account automation servers 130 uses the trained ML models to generate a recommended transaction at least in part by inputting the intent for the transaction to the trained ML models. In some examples, the one or more account automation servers 130 store the recommended transaction in the account automation data structures 135.

In some examples, the training data for the one or more ML models can include historical information, an intent for the transaction identified in the historical information, and/or a second transaction performed by the user after the transaction identified in the historical information. The second transaction may be related to the intent and/or to the transaction identified in the historical information. During a validation stage of training, the one or more account automation servers 130 can use the one or more ML models to generate a recommended transaction based on the intent and/or based on the historical information, and the one or more account automation servers 130 can update and/or further train the one or more ML models based on whether or not the recommended transaction matches the second transaction from the training data. In some examples, the one or more account automation servers 130 uses the first trained ML engine to identify the intent for the transaction and uses a second trained ML engine to generate the recommended transaction. In some examples, the one or more account automation servers 130 uses a first trained ML engine both to identify the intent for the transaction and to generate the recommended transaction.

The one or more account automation servers 130 output the recommended transaction. In some examples, the one or more account automation servers 130 output the recommended transaction by displaying the recommended transaction using a display. In some examples, the one or more account automation servers 130 output the recommended transaction by sending the recommended transaction to the user device 120 associated with the user over a network using a communication transceiver. In some examples, the one or more account automation servers 130 output the recommended transaction by initiating, processing, and/or completing the transaction. In some examples, the one or more account automation servers 130 output the recommended transaction by communicating with a transaction processing system over a network to request that the transaction processing system that initiate, process, and/or complete the transaction.

The one or more account automation servers 130 receive a confirmation regarding the recommended transaction. In some examples, the confirmation is an approval from the user device 120 associated with the user to initiate the recommended transaction. In response to the confirmation, the one or more account automation servers 130 can initiate, process, and/or complete the transaction. In response to the confirmation, the one or more account automation servers 130 can communicate with a transaction processing system to request that the transaction processing system initiate, process, and/or complete the transaction. In some examples, the confirmation is a confirmation received from a transaction processing system (or a component of the one or more account automation servers 130) that confirms that the transaction has been initiated, processed, and/or completed. The one or more account automation servers 130 can output a message based on the confirmation, for instance by displaying the message using a display and/or sending the message to the user device 120 associated with the user.

In some examples, the one or more account automation servers 130 request and/or receive feedback from the user device 120 associated with the user regarding the recommended transaction. The one or more account automation servers 130 can update and/or further train the one or more ML models based on the feedback from the user device 120 associated with the user. For instance, if the feedback is positive (e.g., confirming, indicating, and/or suggesting approval and/or authorization of the recommended transaction), then the one or more account automation servers 130 can reinforce weights and/or connections within the one or more ML models that contributed to the generation of the recommended transaction. If the feedback is negative (e.g., indicating and/or suggesting disapproval and/or lack of approval/authorization of the recommended transaction), then the one or more account automation servers 130 can weaken, remove, and/or replace weights and/or connections within the one or more ML models that contributed to the generation of the recommended transaction.

The account automation servers 130 can use the account management servers 140 and/or account management data structures 145 to automatically perform transactions and/or interactions between different accounts associated with different users. The accounts can include at least the account associated with the user and a second account. The second account can be associated with, for instance, a second user, a merchant, a service provider, a financial institution, a donor, a donation recipient, or another entity discussed herein. The transactions and/or interactions between different accounts that are performed by the account automation servers 130 and/or the account management servers 140 can correspond to the recommended transaction. The transactions and/or interactions can include an automatic transfer of one or more assets, such as an automatic donation, purchase, or transfer of funds. In some examples, the account automation servers 130 identifies (e.g., based on information received from the account management servers 140 and/or account management data structures 145, such as the historical information, the intent for the transaction, and/or the recommended transaction) that a first user has purchased a product (a good or a service) as part of a first purchase using a first user payment account. The account automation servers 130 automatically select a second user payment account of a second user, a merchant, a service provider, a financial institution, a donor, a donation recipient, or another entity discussed herein. The second user payment account can be a user payment account, a merchant account, a donation account, and the like. The account automation servers 130 and/or the account management servers 140 can automatically trigger, initiate, process, and/or complete transfer of a quantity of the one or more assets (e.g., funds, stocks, bonds, points, store credit, in-game credit, gift card credit, cryptocurrencies, non-fungible tokens (NFTs), other digital assets, etc.) from the second user payment account to the first user payment account, and can communicate an indicator to the user device 120 indicating that the transfer has been initiated, processed, completed, and/or performed.

In some examples, the account automation servers 130 and/or account management servers 140 can process transactions dynamically and/or in real-time while receiving additional historical data about additional transactions, determining intents for additional transactions, and/or determining additional recommended transactions based on the additional transactions. In some examples, the account automation servers 130 and/or account management servers 140 can determine the recommended transaction based on the transaction dynamically and/or in real-time while receiving additional historical data about additional transactions and/or determining intents for additional transactions. In some examples, the account automation servers 130 and/or account management servers 140 can determine the intent for the transaction dynamically and/or in real-time while receiving additional historical data about additional transactions. In some cases, certain users, user devices 120, and/or accounts can be associated with banks, credit card institutions, debit card institutions, financial institutions, or other companies, organizations, or institutions. For example, a financial institution or company can have one or more accounts and/or user devices 120 that interact with the voice interface gateway servers 125, the account automation servers 130, and/or the account management servers 140.

While the voice interface gateway servers 125, the account automation servers 130, and the account management servers 140 are referred to herein as servers, it should be understood that these may be laptop computers, desktop computers, mobile devices, terminals, kiosks, mobile handsets, smartphones, any other type of computing system 1500 discussed herein, or a combination thereof. The account automation data structures 135 and account management data structures 145 may be any type of data structures, such as databases, tables, spreadsheets, key-value stores, dictionaries, relational models, arrays, lists, arraylists, trees, hashgraphs, distributed ledgers, blockchain ledgers, distributed acyclic graph (GAD) ledgers, other types of data structures discussed herein, or some combination thereof. In some cases, the account automation data structures 135 may be referred to as valid request databases, or with the phrase "valid request" followed by any of the other types of data structures. Similarly, the account management data structures 145 may be referred to as account management databases, or with the phrase "account management" followed by any of the other types of data structures.

Figure 2:
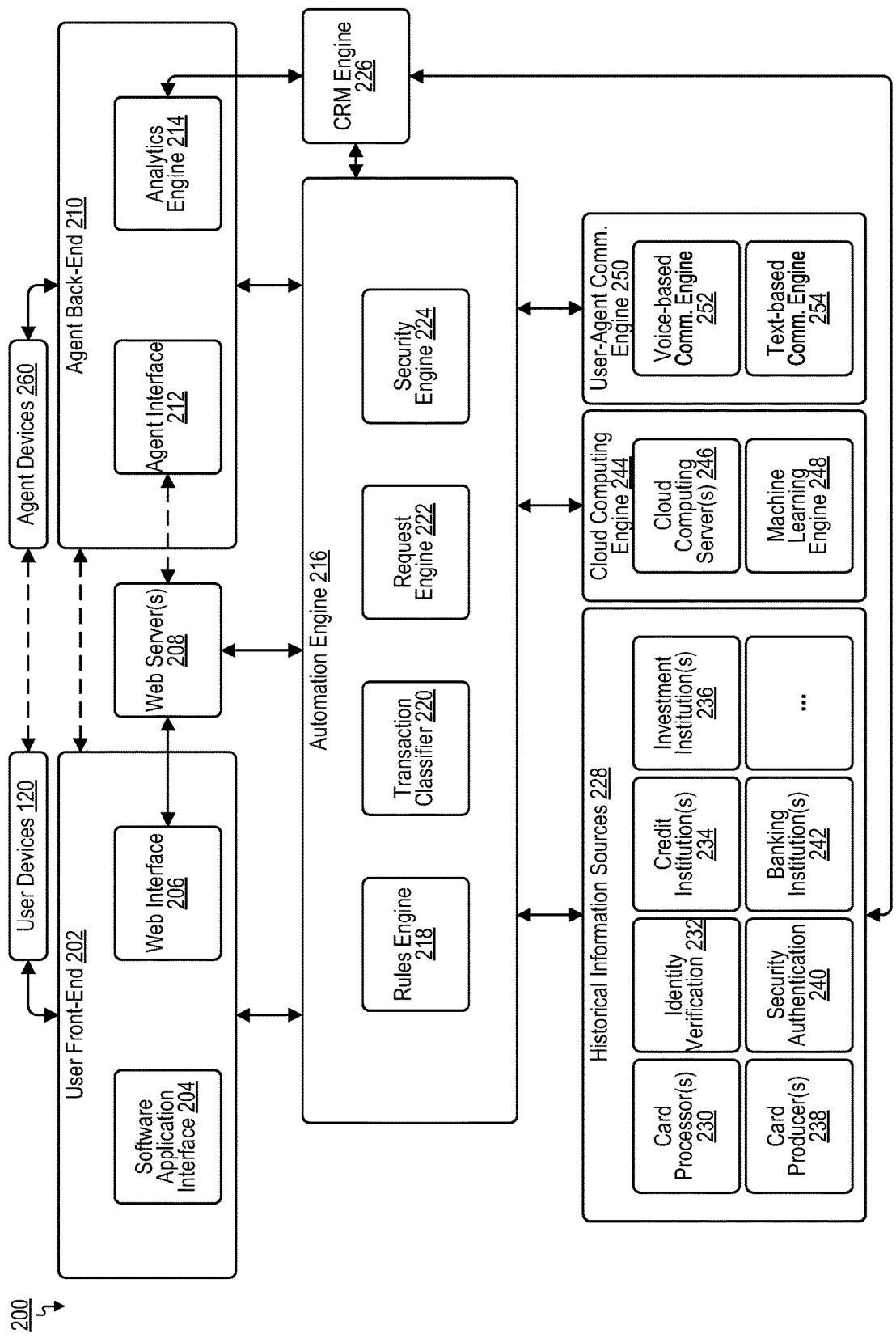
FIG. 2 is a block diagram illustrating a system architecture of a system for intent-based recommendations, in accordance with some examples.

FIG. 2 is a block diagram 200 illustrating a system architecture of a system for intent-based recommendations. The system includes a user front-end 202, an agent back-end 210, an automation engine 216, historical information sources 228, a cloud computing engine 244, a user-agent communication engine 250, web server(s) 208, and a customer relationship management (CRM) engine 226.

The user front-end 202 provides user devices 120 with access to the automation engine 216. The user front-end 202 includes a software application interface 204 that connects to software applications, programs, or apps running on user devices 120. The software application interface 204 can include one or more application programming interfaces (APIs) that the software applications, programs, or apps running on user devices 120 can call in order to trigger certain actions at, or interactions with, the automation engine 216. The user front-end 202 includes a web interface 206 that provides data to, and/or receives data from, a website hosted by the web server(s) 208. A user device 120 can access the website, for instance through a browser or another software application capable of receiving data from a network and presenting a page or interface at the user device 120. The web interface 206 can include one or more application programming interfaces (APIs) that the user device 120 and/or web server(s) 208 can call in order to trigger certain actions at, or interactions with, the automation engine 216. In some examples, a user device 120 can request information from the automation engine 216 via the software application interface 204 and/or via the web interface 206 (e.g., via the website hosted by the web server(s) 208). In some examples, a user device 120 can provide information to the automation engine 216 via the software application interface 204 and/or via the web interface 206 (e.g., via the website hosted by the web server(s) 208). In some examples, the user front-end 202 can include the voice interface gateway server(s) 125.

The agent back-end 210 provides agent devices 260 with access to the automation engine 216. The agent back-end 210 includes an agent interface 212. In some examples, the agent interface 212 connects to software applications, programs, or apps running on agent devices 260. The agent interface 212 can include one or more application programming interfaces (APIs) that the software applications, programs, or apps running on agent devices 260 can call in order to trigger certain actions at, or interactions with, the automation engine 216. The agent back-end 210 can include a web interface (similar to web interface 206) that provides data to, and/or receives data from, a website hosted by the web server(s) 208. An agent device 102 can access the website, for instance through a browser or another software application capable of receiving data from a network and presenting a page or interface at the agent device 102. The agent interface 212 can include one or more application programming interfaces (APIs) that the agent device 260 and/or web server(s) 208 can call in order to trigger certain actions at, or interactions with, the automation engine 216. In some examples, an agent device 102 can request information from the automation engine 216 via the agent interface 212. In some examples, an agent device 102 can provide information to the automation engine 216 via the agent interface 212. In some examples, the agent back-end 210 can include the voice interface gateway server(s) 125.

In some examples, an agent device 260 may communicate with a user device 120, either directly or through the user front-end 202, the agent back-end 210, the automation engine 216, the web server(s) 208, or a combination thereof. For example, an agent using the agent device 260 may communicate with a user using the user device 120. The agent may be a human operator or an artificial intelligence (AI) assistant. In some examples, a human operator and an AI assistant may both act as the agent at the agent device 260, for instance at different times or for different portions of a conversation with the user at the user device 120. In some examples, the user, via the user device 120, may ask a question or make a request, which may be sent to the agent device 260 for the agent to answer or respond to. In some examples, if the agent does not answer or respond within a threshold period of time, an AI assistant at the agent device 260 and/or at the agent back-end 210 may automatically prepare a response with a preliminary answer/response and/or with a message requesting that the user at the user device 120 please wait for the agent to respond. In some examples, the AI assistant may supply an answer and/or response if the AI assistant is capable of doing so on its own, for instance if the user's question or request matches a question or request in a frequently asked questions data structure or frequent requests data structure, respectfully. Such data structures may identify responses (or types of responses) that the AI assistant can respond to the user with, and/or tasks that the AI assistant can perform or initiate (e.g., for the automation engine 216 to perform), in response to the user's questions or requests.

The agent back-end 210 includes an analytics engine 214 that is coupled to the CRM engine 226. The CRM engine 226 can receive information from the historical data sources 228, either directly or through the automation engine 216. The CRM engine 226 can receive and organize the information from the historical data sources 228. The analytics engine 214 can parse and/or normalize the information from the CRM engine 226, and can generate analytics based on the information from the CRM engine 226. The analytics can include, for example, trends, projections, predictions as to when a user may make a request or purchase a product or service, based on patterns in the user's requests and/or transactions that the analytics engine 214 identifies based on the information from the CRM engine 226 and/or the historical information sources 228. The analytics engine 214 can provide these analytics to the agent devices 260, for instance through the agent interface 212. This way, an agent communicating through their agent device 260 with a user at a user device 120 can have any information that might be useful for the agent to help answer the user's questions, fulfill the user's request, assist the user with a transaction, request feedback from the user on recommended transactions and/or intent determinations, or combinations thereof.

The automation engine 216 automates various tasks requested by users via user devices 120 and/or the user front-end 202, requested by agents using agent devices 260 and/or the agent back-end 210, or a combination thereof. The automation engine 216 receives information from, and provides information to, user devices 120 via the user front-end 202. The automation engine 216 receives information from, and provides information to, agent devices 260 via the agent back-end 210. The automation engine 216 includes a rules engine 218, a transaction classifier 220, a request engine 222, and a security engine 224. In some examples, the automation engine 216 can include the account automation server(s) 130, the account automation data structure(s) 135, the account management server(s) 140, the account management data structure(s) 145, the voice interface gateway server(s) 125, or a combination thereof.

The automation engine 216 is coupled to the historical information sources 228, the CRM engine 226, and/or the analytics engine 214. The automation engine 216 can request and/or receive information from the historical information sources 228, the CRM engine 226, and/or the analytics engine 214. The historical information sources 228 include card processors 230, card producers 238, identity verification engines 232, security authentication engines 240, credit institutions 234, banking institutions 242, investment institutions 236, financial institutions, merchants, service providers, gift card providers, online marketplaces, online stores, brick-and-mortar stores, brick-and-mortar marketplaces, other data sources discussed herein, or combinations thereof. From the historical information sources 228 and/or the CRM engine 226, the automation engine 216 can receive information about a user (corresponding to a user device 120) such as a history of one or more transactions in which one or more assets (e.g., a quantity of funds) was transferred from an account associated with the user to another account (e.g., associated with a second user, with a merchant, with a service provider, with a credit institution, with a banking institution, with an investment institution, and/or with another financial institution). From the historical information sources 228 and/or the CRM engine 226, the automation engine 216 can receive information about a user (corresponding to a user device 120) such as a history of one or more transactions in which one or more assets (e.g., a quantity of funds) was transferred to an account associated with the user from another account (e.g., associated with a second user, with a merchant, with a service provider, with a credit institution, with a banking institution, with an investment institution, and/or with another financial institution). From the historical information sources 228 and/or the CRM engine 226, the automation engine 216 can receive information about a user (corresponding to a user device 120) such as demographic data 810, psychographic data 815, behavioral data 820, geographic data 825, other categories of data, or combinations thereof. In some examples, at least a subset of the historical information sources 228 may be stored at, and/or may include data stored at, the account automation data structure(s) 135, the account management data structure(s) 145, or a combination thereof. In some examples, at least a subset of the historical information sources 228 may be stored at the automation engine 216 and/or at the CRM engine 226.

The automation engine 216 is coupled to the cloud computing engine 244. The cloud computing engine 244 includes cloud computing server(s) 246. The cloud computing engine 244 can perform computationally intensive tasks for the automation engine 216. For instance, the cloud computing engine 244 can include a machine learning (ML) engine 248. The ML engine 248 can generate, train, run, and/or use one or more ML models. Examples of the one or more ML models include the one or more trained ML models of operation 310 and operation 312 of FIG. 3B, the first trained ML model of operations 322-328 of FIG. 3C, the second trained ML model of operations 330-334 of FIG. 3C, the ML models 435 of FIGS. 4 and 5A-5B, one or more ML models of the engagement AI/ML engine 612, one or more ML models of the AI/ML engine 660, the neural network 1400 of FIG. 14, and combinations thereof. Examples of the ML engine 248 include the ML engine associated with the one or more trained machine learning models of operation 310 and operation 312 of FIG. 3B, the ML engine associated with the first trained ML model of operations 322-328 of FIG. 3C, the ML engine associated with the trained ML model of operations 330-334 of FIG. 3C, the ML engine 430 of FIGS. 4 and 5A-5B, the engagement AI/ML engine 612, the AI/ML engine 660, the AI/ML engine 925, the neural network 1400 of FIG. 14, and combinations thereof. In some examples, at least a subset of the cloud computing engine 244 may be run as part of the automation engine 216. For instance, the automation engine 216 can include at least a subset of the cloud computing servers 246, the ML engine 248, and/or the one or more ML models.

The automation engine 216 is coupled to the user-agent communication engine 250. The user-agent communication engine 250 includes communication infrastructure that allows a user device 120 to communicate with an agent device 260 through the automation engine 216 and/or through the user-agent communication engine 250 and/or through the web server(s) 208. The user-agent communication engine 250 includes a voice-based communication engine 252 and a text-based communication engine 254. The voice-based communication engine 252 can connect the user device 120 and the agent device 260 together via voice-based communication, such as telephony, voice over internet protocol (VOIP), teleconferencing, video conferencing, cloud phone, webinars, video teleconferencing, or a combination thereof. In some examples, the voice-based communication engine 252 can call APIs for, include plugins for, and/or run instances of, services such as Zoom®, Skype®, Microsoft® Teams®, Cisco® WebEx®, Google® Hangouts®, Google® Duo®, Google® Voice®, Google® Meet®, Apple® Facetime®, Viber®, and the like. The text-based communication engine 254 can connect the user device 120 and the agent device 260 together via a text-based messaging platform. In some examples, the text-based communication engine 254 can call APIs for, include plugins for, and/or run instances of, services such as short message service (SMS), multimedia messaging service (MMS), rich communication services (RCS), Apple® iMessage®, Apple® Business Chat®, Google® RCS for Business Messaging®, Google® Jibe®, Google® Hangouts®, Google® Chat®, Google® Docs® Chat®, Google® Talk®, Facebook® Messenger®, Twitter® Direct Messages, Instagram® Direct Messages, WhatsApp®, Slack®, Slack® Channels, Cisco® Jabber®, Microsoft® Teams® Chat, and the like. In some examples, the user-agent communication engine 250 can include a voice-to-text interpreter engine, a text-to-speech synthesizer, or a combination thereof. In some examples, the user-agent communication engine 250 can include, and/or can be a part of, the voice interface gateway server(s) 125.

The request engine 222 of the automation engine 216 receives, interprets, and/or handles requests from the user device(s) 120 and/or from the agent device(s) 260. In some examples, the requests may include, for example, requests for recommended transactions or interactions. To fulfill the requests, the automation engine 216 can retrieve information associated with the user in question from the historical information source(s) 228 and/or CRM engine 226. For example, the automation engine 216 can retrieve historical information identifying one or more transactions from a transaction history associated with the user, the user's account, and/or the user device 120 corresponding to the user. The automation engine 216 can classify the transactions into categories or classifications using the transaction classifier 220. In some examples, the automation engine 216 can determine an intent for one or more of the transactions by inputting the historical information, and/or the classification(s), into one or more ML models of the ML engine 248 that are trained to output the intent. In an illustrative example, the automation engine 216 can determine that a user's intent behind a transaction in which the user purchase automotive products or services (e.g., motor oil, gasoline, windshield wipers, tires, oil change, tire rotation, car wash) was for the transaction to be for a vehicle that the user owns, leases, drives, or otherwise has access to operate. The automation engine 216 can generate a recommended transaction based on this intent, for example by inputting the intent, and/or the historical information, into one or more ML models of the ML engine 248 that are trained to output the recommended transaction. The recommended transaction can be based on a transaction in the historical information, for instance being complementary to the transaction in the historical information and sharing the intent of the transaction in the historical information. For instance, if the historical information includes a recent transaction for an oil change service, the recommended transaction might be for a tire rotation service. If the historical information includes a recent transaction for a car wash, the recommended transaction might be for a car waxing.

In another example, the automation engine 216 can determine that a user's intent behind a transaction in which the user purchase home-related products or services (e.g., recessed lighting, floorboards, cabinets, chairs, carpet cleaning service) was for the transaction to be for a house, home, apartment, condo, or other residence that the user owns, rents, leases, resides in, or otherwise has access to. The automation engine 216 can generate a recommended transaction based on this intent. For instance, if the historical information includes a recent transaction for wooden floorboards, the recommended transaction might be for a carpet that complements the wooden floorboards. If the historical information includes a recent transaction for a lawnmower, the recommended transaction might be for a weed puller.

In another example, the automation engine 216 can determine that a user's intent behind a transaction in which the user donated to a particular charity was for a cause that the charity advances. The automation engine 216 can generate a recommended transaction based on this intent, for instance by providing a recommended transaction for a donation to another charity that advances a similar cause.

In this way, the automation engine 216 can generate determinations. The determinations by the automation engine 216 can include intent for transactions and/or recommended transactions as discussed herein. The determinations by the automation engine 216 can also include determinations as to whether the user has a car, has a house, is in a relationship, is interested in a particular charity, has a particular political affiliation, and the like. In some examples, the automation engine 216 can provide its determinations to a user device 120 via the user front-end 202, and can request feedback regarding its determinations (e.g., approval or disapproval) from the user device 120 (e.g., from the user) via the user front-end 202. Similarly, in some examples, the automation engine 216 can provide its determinations to an agent device 260 via the agent back-end 210, and can request, via the agent back-end 210, that the agent using the agent device 260 request and convey feedback from the user device 120 (from the user device) regarding the automation engine 216's determinations (e.g., approval or disapproval). For example, the automation engine 216 can send a message to the agent using the agent device 260 indicating that the agent using the agent device 260 has determined that the user likely has a car (e.g., because the user purchased motor oil and paid for a car wash), and can request the agent ask a question of the user (e.g., "do you have a car?") to verify this determination.

The rules engine 218 can include rules that may be used by the automation engine 216 for fulfilling certain requests. The rules may include general rules as well as personalized rules that are specific to certain users. General rules may include rules preventing recommendation of certain types of transactions at certain times, such as preventing recommendations for transactions at restaurants or merchants while those restaurants or merchants are closed. Personalized rules can be personalized to users regionally. For instance, personalized rules can include weather rules 1110 that encourage some types of transactions to be used as recommended transactions in certain types of weather, while discouraging or prohibiting other types of transactions to be used as recommended transactions during the same types of weather. For instance, if the automation engine 216 identifies that the weather is currently raining heavily in the region that the user is in, the weather rules 1110 can encourage transactions for umbrellas for the recommended transactions, while discouraging or prohibiting transactions for steep hiking trails. Personalized rules can also include rules relating to a user's interests, preferences, habits, patterns, accounts, and the like. Example of rule types of the rules engine 218 include the rule types 1105 of FIG. 11.

The security engine 224 can verify the authenticity of requests, transactions, user accounts, user identifiers, credit card information, debit card information, and the like. In some cases, the security engine 224 can verify authenticity based on rules in the rules engine 218. For instance, if user identity has been verified via digital certificate against a trusted certificate authority, the user identity can be verified as authentic. Similarly, the security engine 224 can flag as inauthentic or unauthorized requests, transactions, user accounts, user identifiers, credit card information, debit card information, and the like. For instance, if repeated requests are received from the same device with slightly different card information, address information, passwords, or some other piece of information, this may suggest an attempted brute-force attack, and any resulting requests or transactions may be treated as suspicious, inauthentic, and/or unauthorized.

Figure 3A:
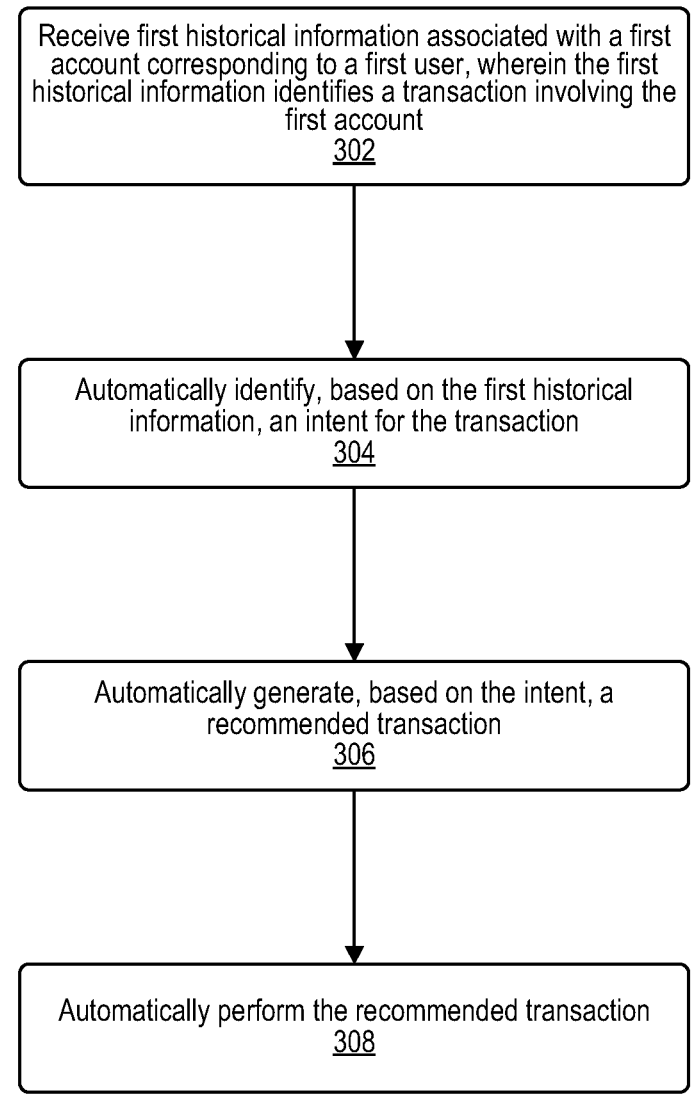
FIG. 3A is a flow diagram illustrating a process for automated account interactions, in accordance with some examples.
Figure 3B:
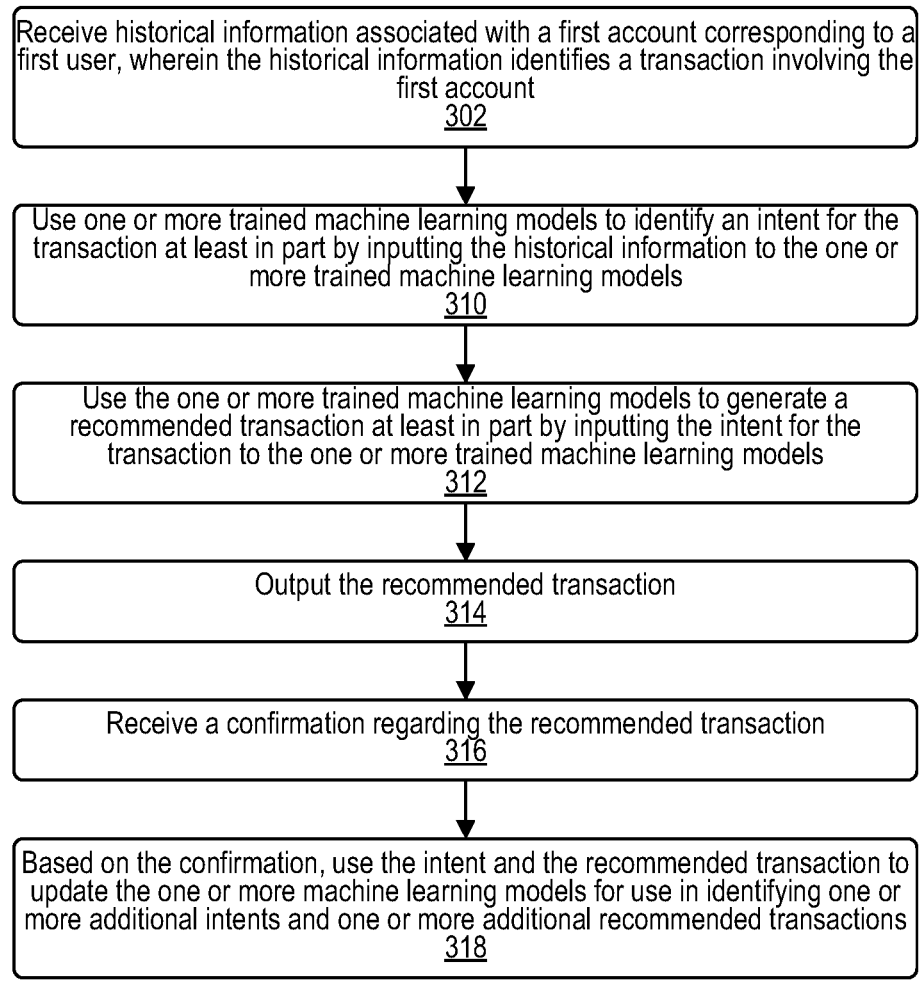
FIG. 3B is a flow diagram illustrating a process for automated account interactions using one or more trained machine learning models, in accordance with some examples.
Figure 3C:
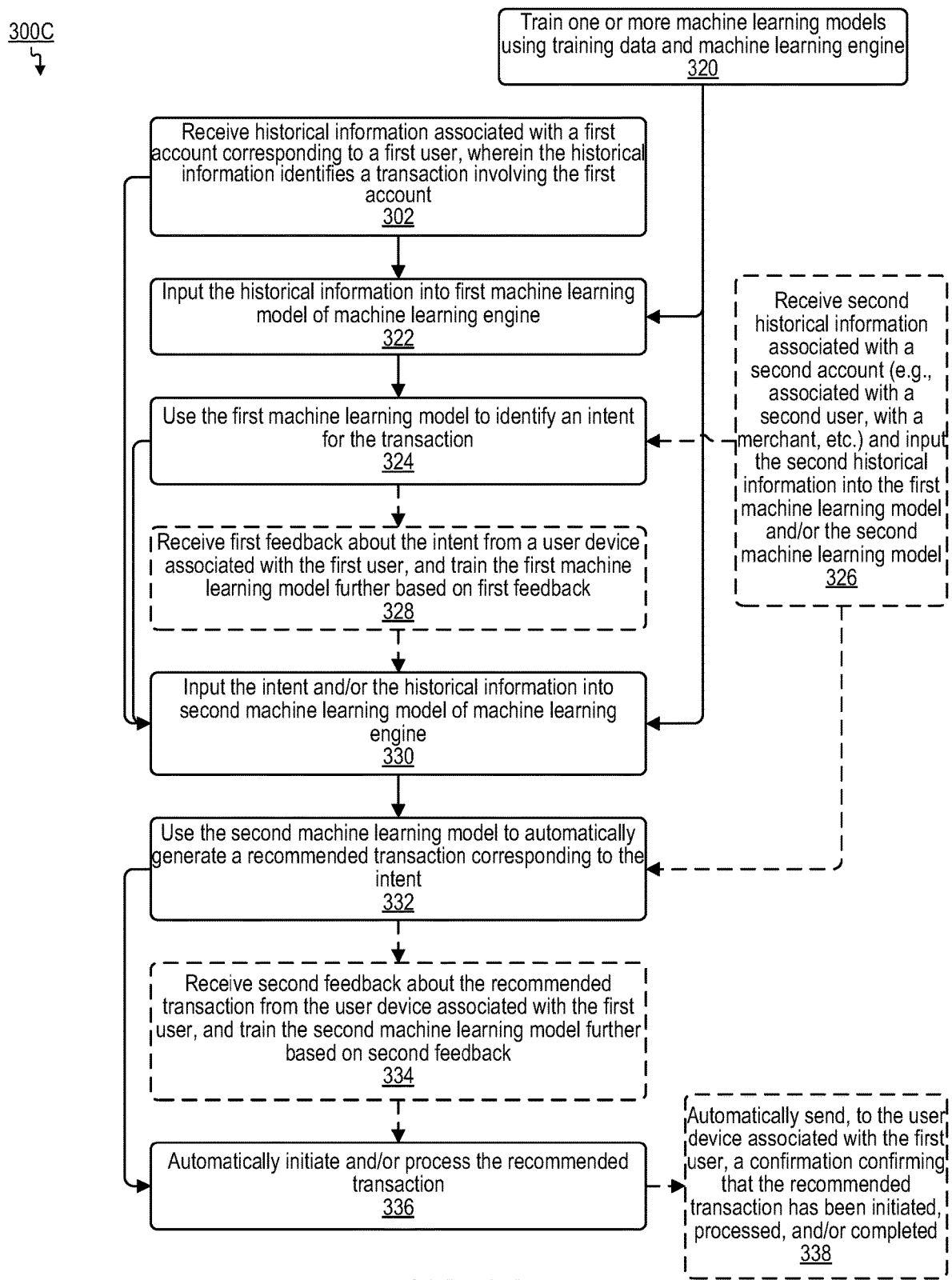
FIG. 3C is a flow diagram illustrating a process for automated account interactions using multiple trained machine learning models, in accordance with some examples.

FIGS. 3A-3C are flow diagrams 300A-300C illustrating processes for automated account interactions. Each of the processes of FIGS. 3A-3C may be performed by an account management system. The account management system(s) of FIGS. 3A-3C can include, for example, the one or more account automation servers 130, the one or more account management servers 140, the one or more account automation data structures 135, the one or more account management data structures 145, the one or more voice interface gateway servers 125, the user device 120, the user front-end 202, the web server(s) 208, the agent back-end 210, the automation engine 216, the CRM engine 226, the historical information sources 228, the cloud computing engine 244, the user-agent communication engine 250, the ML engine 430, the user device 602, the agent platform 606, the historical information engine 618, the data analysis engine 654, the CRM engine 614, the interaction engine 662, the analysis engine 702, the classifiers 704, the question service 712, the question data structure 714, the device 718, the question gateway API 722, the feedback data structure 724, the analysis engine 910, the AI/ML engine 925, the analysis engine 1004, the classifiers 1010, the profile data structure 1024, neural network 1400, the computing system 1500, the processor 1510, or a combination thereof. In some examples, at least two of FIGS. 3A, 3B, and 3C may use the same account management system(s) as one another. In some examples, at least two of FIGS. 3A, 3B, and 3C may use different account management systems than one another.

FIG. 3A is a flow diagram 300A illustrating a process for automated account interactions. The process of FIG. 3A may be performed by an account management system as discussed above.

At operation 302, the account management system is configured to, and can, receive first historical information associated with a first account corresponding to a first user. The first historical information identifies a transaction involving the first account. In some examples, the first historical information can include historical information from the historical information sources 228, the CRM engine 226, the historical information engine 618, and the like. Examples of the first historical information include the historical information 405, historical information from the historical information sources 228, historical information from the CRM engine 226, historical information from the historical information engine 618, or a combination thereof. The first historical information can identify a variety of transactions involving the first user and/or the first account, such as transactions with different entities (e.g., transactions with merchants to purchase products, with service providers to receive services, with financial institutions such as banks and credit unions and lenders for financial services, and the like). The first historical information can include, for example, demographic data 810, psychographic data 815, behavioral data 820, geographic data 825, transaction histories, credit histories, account histories of the account, characteristics of the user, actions performed by the first user and/or using the first user account, other types of historical information, or combinations thereof.

At operation 304, the account management system is configured to, and can, automatically identify, based on the first historical information, an intent for the transaction. In some examples, the account management system identifies the intent for the transaction using one or more ML models and based on the first historical information, for instance as discussed with respect to operation 310 of FIG. 3B, as discussed with respect to at least one of operations 322-328 of FIG. 3C, as discussed with respect to FIG. 4, or some combination thereof.

At operation 306, the account management system is configured to, and can, automatically generate, based on the intent, a recommended transaction. The recommended transaction can involve purchase, rental, and/or transfer of one or more assets, such as funds, stocks, bonds, points, store credit, in-game credit, gift card credit, cryptocurrencies, non-fungible tokens (NFTs), other digital assets, or combinations thereof.

Figure 5A:
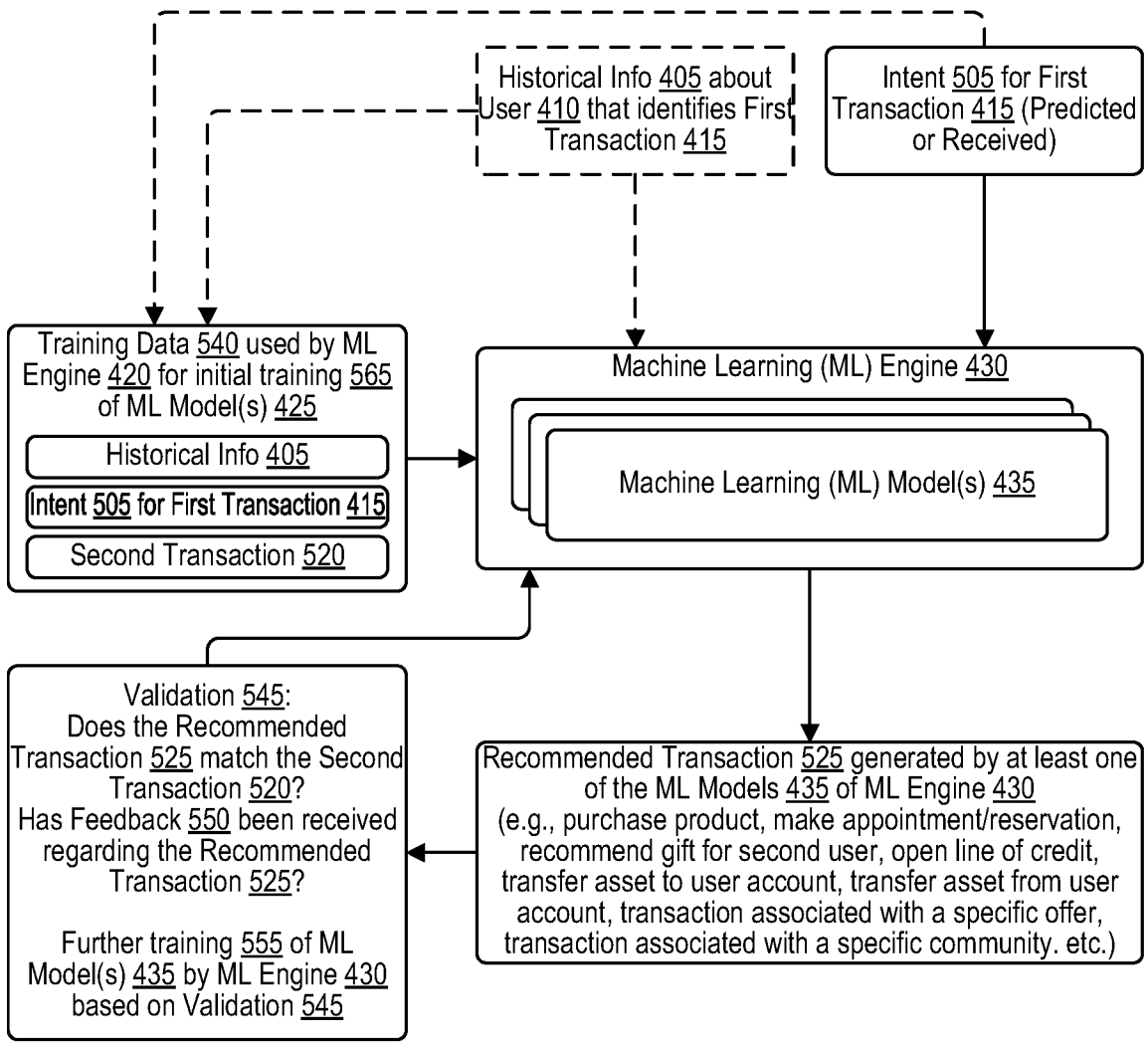
FIG. 5A is a block diagram illustrating using the one or more machine learning models of the machine learning engine to generate a recommended transaction based on an intent for the first transaction and/or based on historical information associated with the user, in accordance with some examples.

In some examples, the account management system generates the recommended transaction using one or more ML models and based on the intent and/or the first historical information, for instance as discussed with respect to operation 312 of FIG. 3B, as discussed with respect to at least one of operations 330-334 of FIG. 3C, as discussed with respect to FIG. 5A, or some combination thereof.

At operation 308, the account management system is configured to, and can, automatically perform the recommended transaction. Performance of the recommended transaction in operation 308 can include imitation, processing, and/or completion of the transaction by the account management system. Performance of the recommended transaction in operation 308 can include sending a communication, by the account management system, to a transaction processing system to request that the transaction processing system initiate, process, and/or complete the recommended transaction. The communication can include details of the transaction, for example identifying the first user, the first account, a transferee account to which funds or other assets are to be transferred to from the first account, a transferor account to which funds or other assets are to be transferred from to the first account, a good or service to be purchased or rented or otherwise licensed, or a combination thereof. Performance of the recommended transaction in operation 308 can include, for example, at least one of operations 314-318 of the process of FIG. 3B, at least one of operations 336-338 of the process of FIG. 3C, or a combination thereof.

Performance of the recommended transaction as in operation 308 can include an automatic transfer of one or more assets, such as an automatic donation, purchase, or transfer of funds. Based on the recommended transaction, the account management system automatically selects a second account of a second user, a merchant, a service provider, a financial institution, a donor, a donation recipient, or another entity discussed herein. The account management system can automatically trigger transfer of a quantity of the one or more assets (e.g., funds, stocks, bonds, points, store credit, in-game credit, gift card credit, cryptocurrencies, non-fungible tokens (NFTs), other digital assets, etc.) between the second account and first account, and can communicate an indicator indicating that the transfer has been performed.

In some examples, the process illustrated in the flow diagram 300A of FIG. 3A can be used to recommend offers instead of or in addition to recommending transactions. Offers may refer to an offered transaction. Offers may also refer to a discount, promotion, coupon, and/or promotion associated with a transaction. In some examples, the process illustrated in the flow diagram 300A of FIG. 3A can be used to recommend other elements instead of or in addition to recommending transactions, such as online communities (e.g., on a social media platform, financial platform, forum, or other community platform), for instance as discussed with respect to FIG. 5B and FIG. 13. It should be understood that references to transactions (recommended or otherwise) in the diagram and discussion of FIG. 3A may also refer to offers and/or communities. For instance, the system can use historical information (e.g., about transactions involving the account, offers involving the account, and/or communities that the account has joined or otherwise interacted with) to determine an intent behind specified transaction(s) and/or offer(s) and/or communitie(s), and can generate and execute on a recommended transaction and/or offer and/or community.

FIG. 3B is a flow diagram 300B illustrating a process for automated account interactions using one or more trained machine learning models. The process of FIG. 3B may be performed by an account management system as discussed above.

Operation 302, previously discussed with respect to the process of FIG. 3A, is also part of the process of FIG. 3B. At operation 302, the account management system is configured to, and can, receive first historical information associated with a first account corresponding to a first user. The first historical information identifies a transaction involving the first account. The first historical information can include historical information can include any of the types of historical information discussed with respect to operation 302 within the process of FIG. 3A.

Figure 4:
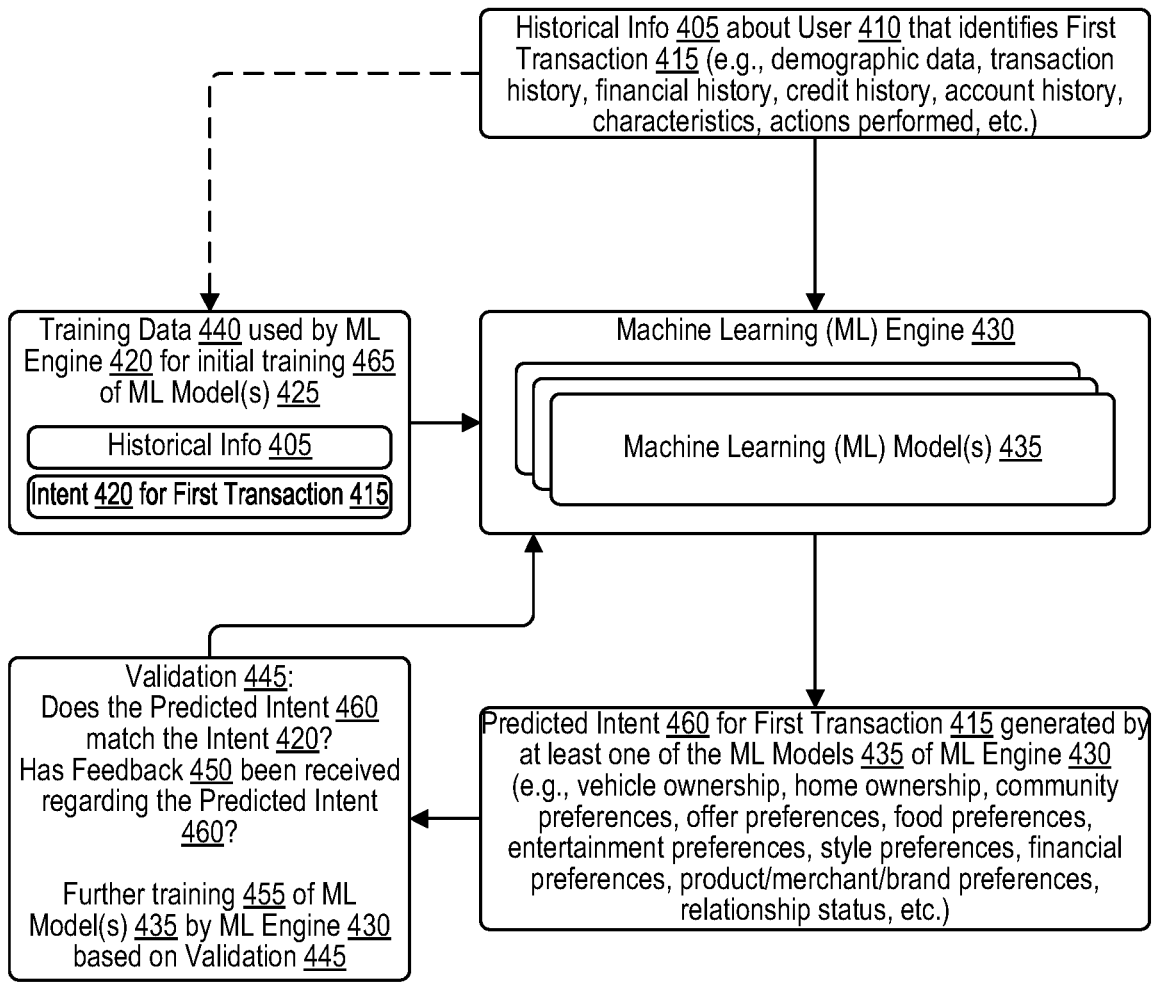
FIG. 4 is a block diagram illustrating using one or more machine learning models of a machine learning engine to determine a predicted intent for a first transaction based on historical information associated with a user, in accordance with some examples.

At operation 310, the account management system is configured to, and can, use the one or more trained machine learning models to identify an intent for the transaction at least in part by inputting the historical information to the one or more trained machine learning models. Examples of the one or more ML models include the first trained ML model of at least one of operations 322-328 of FIG. 3C, the second trained ML model of at least one of operations 330-334 of FIG. 3C, the ML models 435 of at least one of FIGS. 4 and 5A-5B, the one or more ML models of the engagement AI/ML engine 612, he one or more ML models of the AI/ML engine 660, the neural network 1400 of FIG. 14, and combinations thereof. An illustrative example of use of one or more trained ML models to determine an intent for the transaction as in operation 310 is illustrated in FIG. 4, where the one or more ML models 435 determine the predicted intent 460 for the first transaction 415 based on the historical information 405.

In some examples, the training data for the one or more ML models can include historical information and an intent for the transaction identified in the historical information. During a validation stage of training, the account management system can use the one or more ML models to generate a predicted intent for the transaction based on the historical information, and the account management system can update and/or further train the one or more ML models based on whether or not the predicted intent for the transaction matches the intent for the transaction from the training data.

In some examples, the account management system requests and/or receives feedback from the user regarding the intent for the transaction, and updates and/or further trains the one or more ML models based on the feedback.

At operation 312, the account management system is configured to, and can, use the one or more trained machine learning models to generate a recommended transaction at least in part by inputting the intent for the transaction to the one or more trained machine learning models. An illustrative example of use of one or more trained ML models to generate a recommended transaction as in operation 312 is illustrated in FIG. 5A, where the one or more ML models 435 generate the recommended transaction 525 based on the intent 505 and/or the historical information 405.

In some examples, the training data for the one or more ML models can include historical information, an intent for the transaction identified in the historical information, and/or a second transaction performed by the user after the transaction identified in the historical information. The second transaction may be related to the intent and/or to the transaction identified in the historical information. During a validation stage of training, the account management system can use the one or more ML models to generate a recommended transaction based on the intent and/or based on the historical information, and the account management system can update and/or further train the one or more ML models based on whether or not the recommended transaction matches the second transaction from the training data.

In some examples, the account management system uses the a first trained ML engine to identify the intent for the transaction and uses a second trained ML engine to generate the recommended transaction. In some examples, the account management system uses a first trained ML engine both to identify the intent for the transaction and to generate the recommended transaction.

In an illustrative example, outputting the recommended transaction includes sending a message identifying the recommended transaction to a user device associated with the first user, and receiving the confirmation regarding the recommended transaction includes receiving an approval to initiate the recommended transaction from a user device associated with the first user.

In another illustrative example, outputting the recommended transaction includes automatically initiating execution of the recommended transaction on behalf of the first user, and receiving the confirmation regarding the recommended transaction includes receiving a transaction completion confirmation indicating that the recommended transaction has been processed.

In some examples, generating the recommended transaction includes determining an eligibility of the first user for a line of credit. In some aspects, the recommended transaction includes a recommendation to open the line of credit for the first user based on the eligibility.

In some examples, the recommended transaction includes a recommendation to make at least one of an appointment and a reservation with a service provider. In some examples, the recommended transaction includes a recommendation for a purchase (e.g., of one or more goods and/or one or more services) from a merchant.

In some examples, the account management system is configured to, and can, receive schedule information associated with the first user. For example, the account management system can receive the schedule information from a calendar, a to-do-list, a schedule, an itinerary, an email, a text-based message, a phone call, a video call, a set of notes, or a combination thereof. Each of these sources that the account management system can receive the schedule information from can be locally stored on the user device associated with the user, can be stored remotely on a server (e.g., associated with a cloud service), or a combination thereof. In some aspects, the account management system identifies a scheduled event based on the schedule information, and generates the recommended transaction so that the recommended transaction is associated with the scheduled event. For instance, the scheduled event can be the first user's birthday, and the recommended transaction can be for a treat that the first user likes to treat themselves to periodically. The scheduled event can be a birthday of a second user that the first user is in a relationship with, and the recommended transaction can be for a fancy dinner with the first user and the second user. The scheduled event can be a doctor's appointment, and the recommended transaction can be for a prescription from the doctor.

In some examples, the account management system is configured to, and can, generate profiles associated with the user based on the intent for the transaction and/or based on additional intents determined for additional transactions. Each of the profiles identifies one or more preferences of the user with respect a category of transactions of a set of different categories of transactions. Examples of the profiles include, for instance, the taste profile 706, the style profile 708, the entertainment profile 710, the location profile 1018, the hobby profile 1020, the transportation profile 1022, and the like. The account management system can inputting the intent for the transaction to the one or more trained machine learning models in operation 312 by inputting at least one of the profiles into the one or more trained machine learning models.

At operation 314, the account management system is configured to, and can, output the recommended transaction. In some examples, the account management system outputs the recommended transaction by displaying the recommended transaction using a display. In some examples, the account management system outputs the recommended transaction by sending the recommended transaction to the user device associated with the user via a communication transceiver of the account management system. In some examples, the account management system outputs the recommended transaction by initiating, processing, and/or completing the transaction. In some examples, the account management system outputs the recommended transaction by communicating with a second system to request that the second system that initiate, process, and/or complete the transaction.

At operation 316, the account management system is configured to, and can, receive a confirmation regarding the recommended transaction. In some examples, the confirmation is approval from the user to initiate the recommended transaction. In response to the confirmation, the account management system can initiate, process, and/or complete the transaction. In response to the confirmation, the account management system can communicate with a second system to request that the second system initiate, process, and/or complete the transaction. In some examples, the confirmation is a confirmation received from a second system (or a component of the account management system) that confirms that the transaction has been initiated, processed, and/or completed. The account management system can output a message based on the confirmation, for instance by displaying the message using a display and/or sending the message to the user device associated with the user.

At operation 318, the account management system is configured to, and can, use, based on the confirmation, the intent and the recommended transaction to update the one or more machine learning models for use in identifying one or more additional intents and one or more additional recommended transactions. In some examples, the account management system requests and/or receives feedback from the user regarding the intent and/or recommended transaction, and updates and/or further trains the one or more ML models based on the feedback. For instance, if the feedback is positive, then the update to the ML models can reinforce weights and/or connections within the one or more ML models that contributed to the determination of the intent for the transaction and/or to the generation of the recommended transaction. If the feedback is negative, then the update can weaken, remove, and/or replace weights and/or connections within the one or more ML models that contributed to the determination of the intent for the transaction and/or to the generation of the recommended transaction. The account management system requesting the feedback can include the account management system sending, to a user device associated with the first user, a query requesting the feedback.

In an illustrative example, the account management system is configured to, and can, receive feedback from a user device associated with the first user. The feedback can be associated with the intent for the transaction and/or for the recommended transaction. The account management system is configured to, and can, update the one or more trained machine learning models at least in part by using the feedback as training data for the one or more trained machine learning models.

In some examples, the account management system is configured to, and can, automatically initiate execution of the recommended transaction on behalf of the first user in response to receipt of the confirmation. In some examples, the account management system is configured to, and can, automatically output a transaction completion confirmation in response to execution of the recommended transaction.

In some examples, the account management system is configured to, and can, receive second historical information associated with a second account. Identifying the intent for the transaction includes identifying a link between the first account and the second account. Identifying the intent for the transaction is also based on the second historical information. In some examples, the recommended transaction includes a recommendation to transfer one or more assets from the first account to the second account. In some examples, the recommended transaction includes a recommendation to transfer one or more assets from the second account to the first account. In some examples, the second account is associated with a merchant. In some examples, the second account is associated with a second user. In some examples, the recommended transaction is for at least one of a product and a service associated with the second user. In some examples, the recommended is for a gift for the second user. In some examples, the link between the first account and the second account corresponds to a relationship between the first user and the second user.

In some examples, identifying the intent for the transaction includes identifying that the first user has operational access to a vehicle. For instance, the transaction can be for a product and/or a service associated with the vehicle. In some aspects, the recommended transaction is for a second product and/or a second service associated with the vehicle.

In some examples, wherein identifying the intent for the transaction includes identifying that the first user resides in a residence. For instance, the transaction can be for a product and/or a service associated with the residence. In some aspects, the recommended transaction is for a second product and/or a second service associated with the residence.

In some examples, identifying the intent for the transaction includes identifying that the first user works in a profession. For instance, the transaction can be for a product and/or a service associated with the profession. In some aspects, the recommended transaction is for a second product and/or a second service associated with the profession.

In some examples, identifying the intent for the transaction includes identifying that the first user has a relationship with a second user. For instance, the transaction can be for a product and/or a service associated with the second user. In some aspects, the recommended transaction is for a second product and/or a second service associated with the second user.

In some examples, the account management system is configured to, and can, receive additional information associated with the first account, and use one or more trained machine learning models to update the intent for the transaction based on the additional information. In some examples, in response to updating the intent, the account management system is configured to, and can, use one or more trained machine learning models to update the recommended transaction based on the intent. In some examples, the account management system is configured to, and can, receive additional information associated with the first account, and use one or more trained machine learning models to update the recommended transaction based on the additional information.

In some examples, the account management system is configured to, and can, receive a question associated with the first user, determine an answer to the question based on the intent for the transaction, and output the answer to the question. In some examples, the account management system is configured to, and can, receive a question associated with the first user, determine an answer to the question based on the recommended transaction, and output the answer to the question.

In some examples, the account management system is configured to, and can, identify that the first user is characterized by a characteristic based on the intent for the transaction. Use of the one or more trained machine learning models to generate the recommended transaction as in operation 312 can include inputting the characteristic to the one or more trained machine learning models. Examples of the characteristic can include ownership, rental, or operational access to a vehicle, such as a car. Examples of the characteristic can include ownership, rental, residence in, or access to a home or house. Examples of the characteristic can include a relationship between the user and a second user, such as a marriage or partnership.

In some examples, the process illustrated in the flow diagram 300B of FIG. 3B can be used to recommend offers instead of or in addition to recommending transactions. Offers may refer to an offered transaction. Offers may also refer to a discount, promotion, coupon, and/or promotion associated with a transaction. In some examples, the process illustrated in the flow diagram 300B of FIG. 3B can be used to recommend other elements instead of or in addition to recommending transactions, such as online communities (e.g., on a social media platform, financial platform, forum, or other community platform), for instance as discussed with respect to FIG. 5B and FIG. 13. It should be understood that references to transactions (recommended or otherwise) in the diagram and discussion of FIG. 3B may also refer to offers and/or communities. For instance, the system can use historical information (e.g., about transactions involving the account, offers involving the account, and/or communities that the account has joined or otherwise interacted with) to determine (using the one or more trained ML model(s)) an intent behind specified transaction(s) and/or offer(s) and/or communitie(s), and can (using the one or more trained ML model(s)) generate and execute on a recommended transaction and/or offer and/or community.

FIG. 3C is a flow diagram 300C illustrating a process for automated account interactions using multiple trained machine learning models. The process of FIG. 3C may be performed by an account management system as discussed above.

Operation 302, previously discussed with respect to the process of FIGS. 3A-3B, is also part of the process of FIG. 3C. At operation 302, the account management system is configured to, and can, receive first historical information associated with a first account corresponding to a first user. The first historical information identifies a transaction involving the first account.

At operation 320, the account management system is configured to, and can, train one or more machine learning models using training data and machine learning engine. Training of the one or more machine learning models can include training of the first trained ML model of operations 322-328 (e.g., as in FIG. 4) and/or training of the second trained ML model of operations 330-334 (e.g., as in FIGS. 5A-5B). Training of the one or more machine learning models can include training stages (e.g., using training data 440 and/or training data 540) and validation stages (e.g., as in validation 445 and/or validation 545).

At operation 322, the account management system is configured to, and can, input the historical information into first machine learning model of machine learning engine. At operation 326, the account management system is configured to, and can, receive second historical information associated with a second account (e.g., associated with a second user, with a merchant, etc.) and input the second historical information into the first machine learning model. At operation 324, the account management system is configured to, and can, use the first machine learning model to identify an intent for the transaction. In some examples, operation 310 of the process of FIG. 3B can include operation 322, operation 326, and/or operation 324.

At operation 328, the account management system is configured to, and can, receive first feedback about the intent from a user device associated with the first user, and train the first machine learning model further based on first feedback. In some examples, operation 310 of the process of FIG. 3B can include operation 328. In some examples, operation 318 of the process of FIG. 3B can include operation 328.

At operation 330, the account management system is configured to, and can, input the intent and/or the historical information into second machine learning model of machine learning engine. At operation 326, the account management system is configured to, and can, receive second historical information associated with a second account (e.g., associated with a second user, with a merchant, etc.) and input the second historical information into the second machine learning model. At operation 332, the account management system is configured to, and can, use the second machine learning model to automatically generate a recommended transaction corresponding to the intent. In some examples, operation 312 of the process of FIG. 3B can include operation 330, operation 326, and/or operation 332.

At operation 334, the account management system is configured to, and can, receive second feedback about the recommended transaction from the user device associated with the first user, and train the second machine learning model further based on second feedback. In some examples, operation 312 of the process of FIG. 3B can include operation 334. In some examples, operation 318 of the process of FIG. 3B can include operation 334.

At operation 336, the account management system is configured to, and can, automatically initiate and/or process the recommended transaction. In some examples, the outputting of the recommended transaction of operation 314 of the process of FIG. 3B includes operation 336.

At operation 338, the account management system is configured to, and can, automatically send, to the user device associated with the first user, a confirmation confirming that the recommended transaction has been initiated, processed, and/or completed.

In some examples, the process illustrated in the flow diagram 300C of FIG. 3C can be used to recommend offers instead of or in addition to recommending transactions. Offers may refer to an offered transaction. Offers may also refer to a discount, promotion, coupon, and/or promotion associated with a transaction. In some examples, the process illustrated in the flow diagram 300C of FIG. 3C can be used to recommend other elements instead of or in addition to recommending transactions, such as online communities (e.g., on a social media platform, financial platform, forum, or other community platform), for instance as discussed with respect to FIG. 5B and FIG. 13. It should be understood that references to transactions (recommended or otherwise) in the diagram and discussion of FIG. 3C may also refer to offers and/or communities. For instance, the system can use historical information (e.g., about transactions involving the account, offers involving the account, and/or communities that the account has joined or otherwise interacted with) to determine (using the one or more trained ML model(s)) an intent behind specified transaction(s) and/or offer(s) and/or communitie(s), can (using the one or more trained ML model(s)) generate and execute on a recommended transaction and/or offer and/or community, and can update and/or train the one or more trained ML model(s).

FIG. 4 is a block diagram 400 illustrating using one or more machine learning models 435 of a machine learning engine 430 to determine a predicted intent 460 for a first transaction 415 based on historical information 405 associated with a user 410. Examples of the ML engine 430 include the ML engine 248, the ML engine associated with the one or more trained machine learning models of operation 310 and/or operation 312 of FIG. 3B, the ML engine associated with the first trained ML model of at least one of operations 322-328 of FIG. 3C, the ML engine associated with the trained ML model of at least one of operations 330-334 of FIG. 3C, the engagement AI/ML engine 612, the AI/ML, engine 660, the AI/ML engine 925, the neural network 1400 of FIG. 14, and combinations thereof.

The ML engine 430 generates, trains, and uses the one or more ML models 435. Examples of the one or more ML models 435 include the one or more ML models of the ML engine 248, the one or more trained ML models of operation 310 and/or operation 312 of FIG. 3B, the first trained ML model of at least one of operations 322-328 of FIG. 3C, the second trained ML model of at least one of operations 330-334 of FIG. 3C, the one or more ML models of the engagement AI/ML engine 612, the one or more ML models of the AI/ML engine 660, the neural network 1400 of FIG. 14, and combinations thereof.

Once trained via initial training 465, the one or more ML models 435 receive, as an input, historical information 405 about a user 410. The historical information 405 identifies a first transaction 415 involving an account associated with the user 410. In response to receiving the historical information 405 as an input, the one or more ML models 435 determine a predicted intent 460 for the first transaction 415. Examples of the historical information 405 include demographic data 810, psychographic data 815, behavioral data 820, geographic data 825, transaction histories, credit histories, account histories of the account, characteristics of the user, actions performed by the first user and/or using the first user account, other types of historical information, or combinations thereof. Examples of the predicted intent 460 for the first transaction 415 include vehicle ownership, home ownership, food preferences, entertainment preferences, style preferences, financial preferences, product/merchant/brand preferences, relationship status, and the like. The predicted intent 460 can be referred to as the intent.

Determination of the predicted intent 460 as in FIG. 4 can correspond to operations in at least FIGS. 3A, 3B, and 3C. For instance, the determination of the predicted intent 460 can correspond to identifying the intent in operation 304, identifying the intent in operation 310, identifying the intent in operation 324, or combinations thereof.

Once the one or more ML models 435 determine the predicted intent 460, the predicted intent 460 can be used to determine a recommended transaction as illustrated and/or described with respect to at least FIGS. 3A, 3B, 3C, 5A, and 5B. For instance, the predicted intent 460 can be used as the intent basis in operation 306. The predicted intent 460 can be used as the intent that is input to the one or more trained machine learning models in operation 312. The predicted intent 460 and the historical information 405 can be used as the intent and the historical information that are input to the second trained machine learning model in operation 330.

Before using the one or more ML models 435 to determine predicted intents 460, the ML engine 430 performs initial training 465 of the one or more ML models 435 using training data 440. The training data 440 includes examples of historical information 405 about the user 410, and corresponding examples of intent 420 for the first transaction 415. During an initial training stage of the initial training 465, the one or more ML models 435 form connections and weights based on the training data 440.

During a validation stage of the initial training 465, exemplary historical information 405 is input into the one or more ML models 435 to generate a predicted intent 460 as described above. The ML engine 430 performs validation 445 at least in part by determining whether the predicted intent 460 matches the intent 420. If the predicted intent 460 matches the intent 420 during validation 445, then the ML engine 430 performs further training 455 of the one or more ML models 435 by updating the one or more ML models 435 to reinforce weights and/or connections within the one or more ML models 435 that contributed to the determination of the predicted intent 460. If the predicted intent 460 does not matches the intent 420 during validation 445, then the ML engine 430 performs further training 455 of the one or more ML models 435 by updating the one or more ML models 435 to weaken, remove, and/or replace weights and/or connections within the one or more ML models that contributed to the determination of the predicted intent 460.

Validation 445 and further training 455 of the one or more ML models 435 can continue once the one or more ML models 435 are in use based on feedback 450 received on the predicted intent 460 (e.g., from the user 410 via a user device 120 associated with the user 410). The one or more ML models 435 generate the predicted intent 460 as described above. If the feedback 450 is positive (e.g., expresses, indicates, and/or suggests approval of the predicted intent 460), then the ML engine 430 performs further training 455 of the one or more ML models 435 by updating the one or more ML models 435 to reinforce weights and/or connections within the one or more ML models 435 that contributed to the determination of the predicted intent 460. If the feedback 450 is negative (e.g., expresses, indicates, and/or suggests disapproval of the predicted intent 460) then the ML engine 430 performs further training 455 of the one or more ML models 435 by updating the one or more ML models 435 to weaken, remove, and/or replace weights and/or connections within the one or more ML models that contributed to the determination of the predicted intent 460.

FIG. 5A is a block diagram 500A illustrating using the one or more machine learning models 435 of the machine learning engine 430 to generate a recommended transaction 525 based on an intent 505 for the first transaction 415 and/or based on historical information 405 associated with the user 410. Once trained via initial training 565, the one or more ML models 435 receive, as an input, an intent 505 for the first transaction 415. In some examples, the intent 505 is a predicted intent, such as the predicted intent 460. In some examples, the intent 505 is received (e.g., from the user 410) or predetermined, such as the intent 420. In some examples, the one or more ML models 435 also receive, as a second input, historical information 405 about a user 410. The historical information 405 identifies the first transaction 415 involving the account associated with the user 410.

In response to receiving the intent 505 for the first transaction 415 and/or the historical information 405 as input(s), the one or more ML models 435 generate a recommended transaction 525. The recommended transaction 525 can align with the intent 505 for the first transaction 415. In some examples, the recommended transaction 525 can be for a good or service that is completely to another good or service corresponding to first transaction 415. Examples of the recommended transaction 525 include purchasing of a product (e.g., a good or service), making an appointment and/or reservation with a service provider, recommending a gift for a second user who is linked to the user 410 (e.g., via a relationship), opening line of credit for the user 410, transferring one or more assets to the user account associated with the user 410, transfer one or more assets from the user account associated with the user 410, other recommended transactions discussed herein, other transaction types discussed herein, or a combination thereof.

Generating the recommended transaction 525 as in FIG. 5A can correspond to operations in at least FIGS. 3A, 3B, and 3C. For instance, generating the recommended transaction 525 can correspond to generating the recommended transaction in operation 306, generating the recommended transaction in operation 312, generating the recommended transaction in operation 332, or combinations thereof.

Once the one or more ML models 435 generate the recommended transaction 525, the recommended transaction 525 can be output as in operation 314. Once the one or more ML models 435 generate the recommended transaction 525, the recommended transaction 525 can be automatically initiated processed, performed, and/or completed, for instance as in operation 336 and/or operation 338.

Before using the one or more ML models 435 to generate recommended transactions 525, the ML engine 430 performs initial training 565 of the one or more ML models 435 using training data 540. The training data 540 can include examples of historical information 405 about the user 410, corresponding examples of intent 505 for the first transaction 415, and/or a examples of a second transaction 520 corresponding to the intent 505. In some examples, the second transaction 520 is a transaction performed by the user 410 after the first transaction 415. In some examples, the second transaction 520 is a transaction performed by the user 410 before the first transaction 415. During an initial training stage of the initial training 465, the one or more ML models 435 form connections and weights based on the training data 540.

During a validation stage of the initial training 565, exemplary intent 505 and/or historical information 405 is input into the one or more ML models 435 to generate a recommended transaction 525 as described above. The ML engine 430 performs validation 545 at least in part by determining whether the recommended transaction 525 matches the second transaction 520. If the recommended transaction 525 matches the second transaction 520 during validation 445, then the ML engine 430 performs further training 555 of the one or more ML models 435 by updating the one or more ML models 435 to reinforce weights and/or connections within the one or more ML models 435 that contributed to the generation of the recommended transaction 525. If the recommended transaction 525 does not match the second transaction 520 during validation 445, then the ML engine 430 performs further training 455 of the one or more ML models 435 by updating the one or more ML models 435 to weaken, remove, and/or replace weights and/or connections within the one or more ML models that contributed to the generation of the recommended transaction 525.

Validation 545 and further training 555 of the one or more ML models 435 can continue once the one or more ML models 435 are in use based on feedback 550 received on the recommended transaction 525 (e.g., from the user 410 via a user device 120 associated with the user 410). The one or more ML models 435 generate the recommended transaction 525 as described above. If the feedback 550 is positive (e.g., expresses, indicates, and/or suggests approval of the recommended transaction 525), then the ML engine 430 performs further training 555 of the one or more ML models 435 by updating the one or more ML models 435 to reinforce weights and/or connections within the one or more ML models 435 that contributed to the generation of the recommended transaction 525. If the feedback 550 is negative (e.g., expresses, indicates, and/or suggests disapproval of the recommended transaction 525) then the ML engine 430 performs further training 555 of the one or more ML models 435 by updating the one or more ML models 435 to weaken, remove, and/or replace weights and/or connections within the one or more ML models that contributed to the generation of the recommended transaction 525.

Figure 5B:
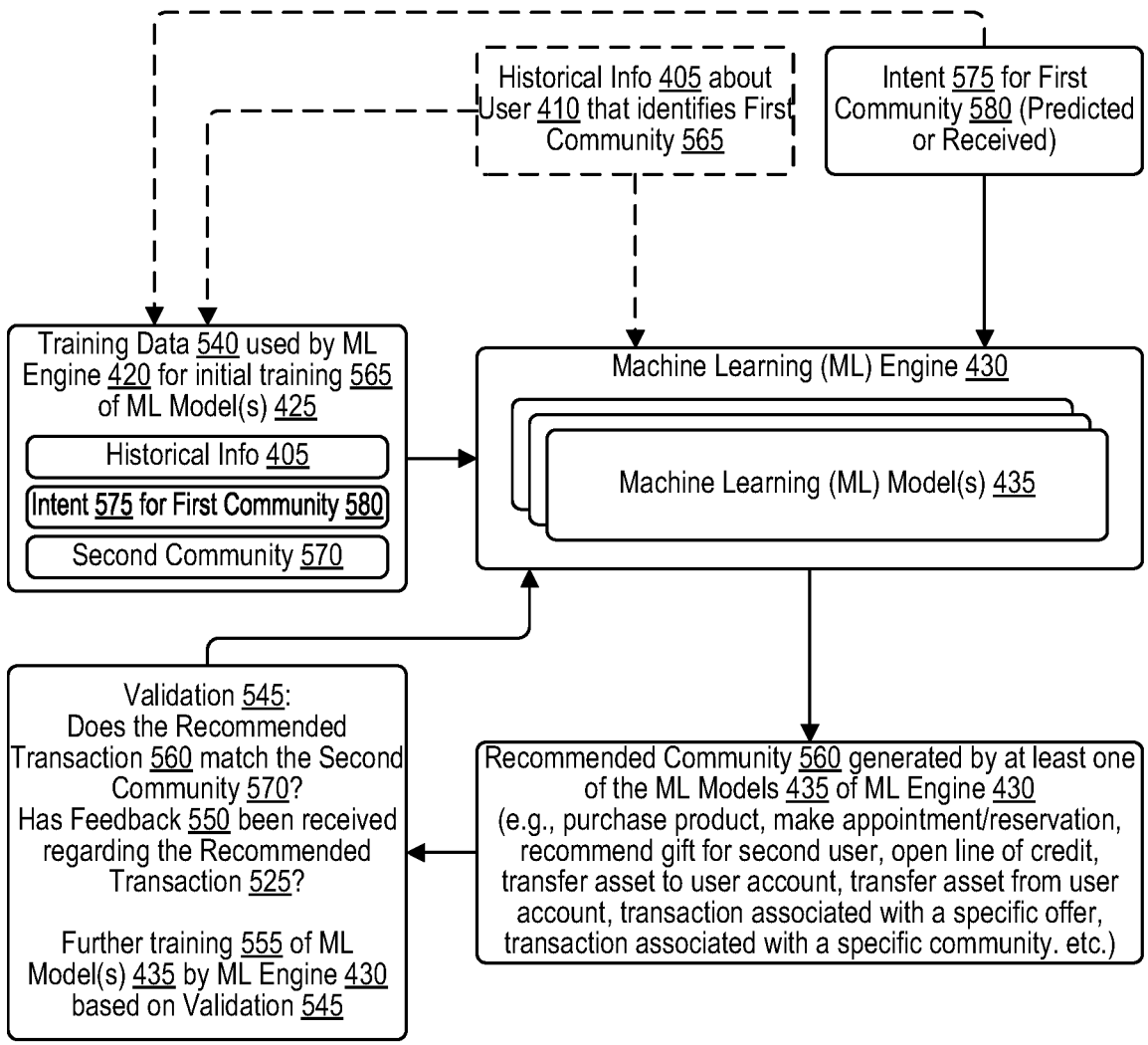
FIG. 5B is a block diagram illustrating using the one or more machine learning models of the machine learning engine to generate a recommended community based on an intent for the first community and/or based on historical information associated with the user, in accordance with some examples.

FIG. 5B is a block diagram 500B illustrating using the one or more machine learning models 435 of the machine learning engine 430 to generate a recommended community 560 based on an intent 575 for a first community 580 and/or based on historical information 405 associated with the user 410. In short, similarly to the generation of the recommended transaction 525 as in FIG. 5A, the ML models 435 of FIG. 5B can also generate a recommended community 560 for a user to join, such as an online community associated with a particular interest and/or demographic group. Once trained via initial training 565, the one or more ML models 435 receive, as an input, an intent 575 for a first community 580 (e.g., that the user has already joined). In some examples, the intent 575 is a predicted intent, such as the predicted intent 460. In some examples, the intent 575 is received (e.g., from the user 410) or predetermined, such as the intent 420. In some examples, the one or more ML models 435 also receive, as a second input, historical information 405 about a user 410. The historical information 405 identifies the first community 580 that the account associated with the user 410 has joined or is otherwise a part of.

In response to receiving the intent 575 for the first community 580 and/or the historical information 405 as input(s), the one or more ML models 435 generate a recommended community 560. The recommended community 560 can align with the intent 575 for the first community 580. In some examples, the recommended community 560 can be associated with a particular interest (e.g., a sport, a genre of music, a genre of movies or TV shows, a genre of literature, a geographic community or neighborhood, a type of merchant or business, charity, cause, and the like). In an illustrative example, a recommended community 560 can be a community interested in soccer in a particular geographic region, a community interested in classical music, and the like.

Generating the recommended community 560 and in FIG. 5B can correspond to operations in at least FIGS. 3A, 3B, and 3C. For instance, generating the recommended community 560 can correspond to generating the recommended transaction in operation 306, generating the recommended transaction in operation 312, generating the recommended transaction in operation 332, generating the recommended transaction 525 of FIG. 5B, generating the recommendation(s) 1310 of FIG. 13, or combinations thereof.

Once the one or more ML models 435 generate the recommended community 560, the recommended community 560 can be output as in operation 314. Once the one or more ML models 435 generate the recommended community 560, the recommended community 560 can be automatically initiated processed, performed, and/or completed, for instance as in operation 336 and/or operation 338.

Before using the one or more ML models 435 to generate the recommended community 560, the ML engine 430 performs initial training 565 of the one or more ML models 435 using training data 540. The training data 540 can include examples of historical information 405 about the user 410, corresponding examples of intent 575 for the first community 580, and/or a examples of a second community 570 corresponding to the intent 575. In some examples, the second community 570 is a community joined by the user 410 after the first community 580. In some examples, the second community 570 is a community joined by the user 410 before the first community 580. During an initial training stage of the initial training 465, the one or more ML models 435 form connections and weights based on the training data 540.

During a validation stage of the initial training 565, exemplary intent 575 and/or historical information 405 is input into the one or more ML models 435 to generate a recommended community 560 as described above. The ML engine 430 performs validation 545 at least in part by determining whether the recommended community 560 matches the second community 570. If the recommended community 560 matches the second community 570 during validation 445, then the ML engine 430 performs further training 555 of the one or more ML models 435 by updating the one or more ML models 435 to reinforce weights and/or connections within the one or more ML models 435 that contributed to the generation of the recommended community 560. If the recommended community 560 does not match the second community 570 during validation 445, then the ML engine 430 performs further training 455 of the one or more ML models 435 by updating the one or more ML models 435 to weaken, remove, and/or replace weights and/or connections within the one or more ML models 435 that contributed to the generation of the recommended community 560.

Validation 545 and further training 555 of the one or more ML models 435 can continue once the one or more ML models 435 are in use based on feedback 550 received on the recommended community 560 (e.g., from the user 410 via a user device 120 associated with the user 410). The one or more ML models 435 generate the recommended community 560 as described above. If the feedback 550 is positive (e.g., expresses, indicates, and/or suggests approval of the recommended community 560), then the ML engine 430 performs further training 555 of the one or more ML models 435 by updating the one or more ML models 435 to reinforce weights and/or connections within the one or more ML models 435 that contributed to the generation of the recommended community 560. If the feedback 550 is negative (e.g., expresses, indicates, and/or suggests disapproval of the recommended community 560) then the ML engine 430 performs further training 555 of the one or more ML models 435 by updating the one or more ML models 435 to weaken, remove, and/or replace weights and/or connections within the one or more ML models that contributed to the generation of the recommended community 560.

Figure 6:
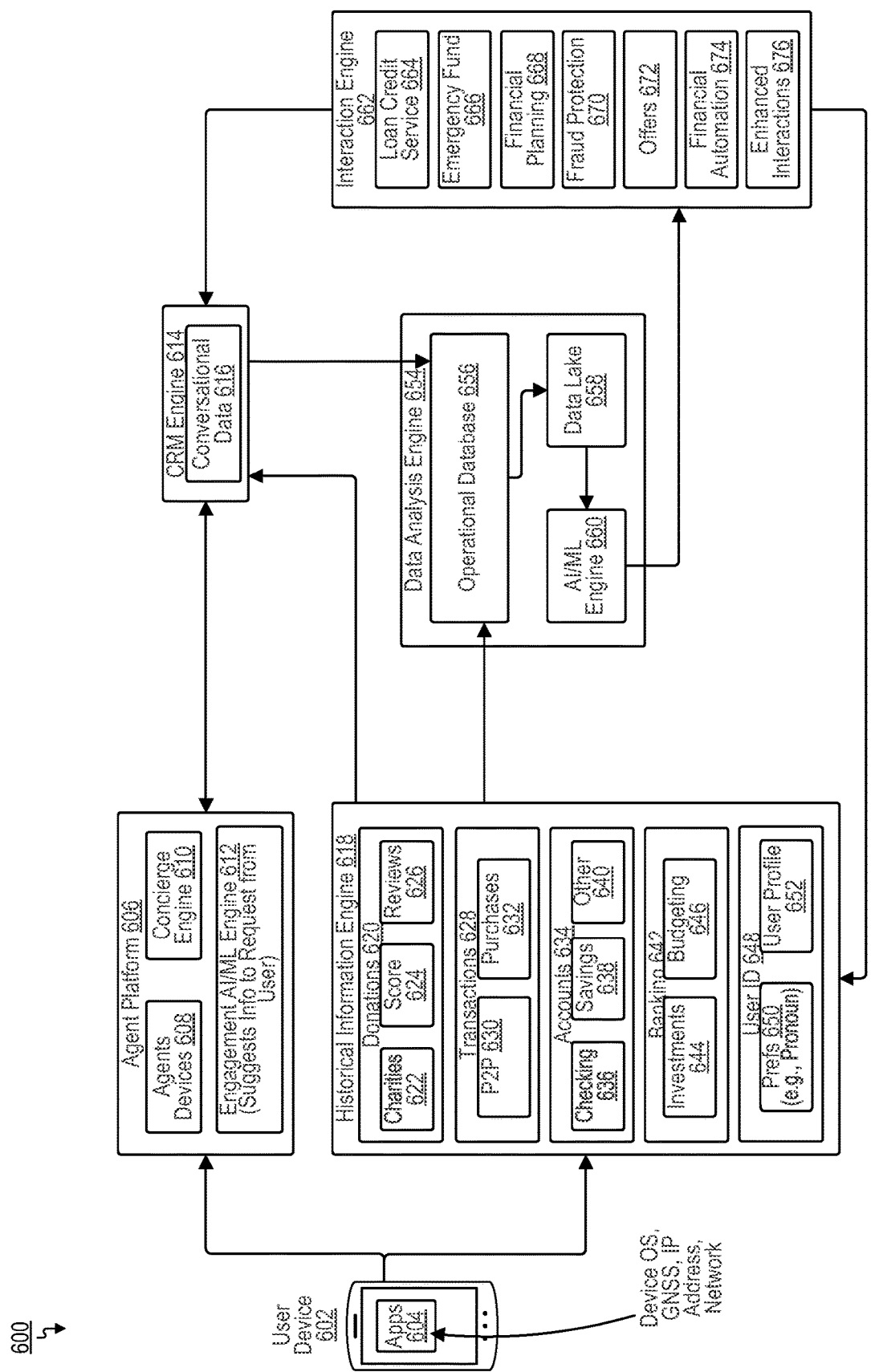
FIG. 6 is a block diagram illustrating a system architecture of a system for intent-based recommendations, in accordance with some examples.

FIG. 6 is a block diagram 600 illustrating a system architecture of a system for intent-based recommendations. The system includes a user device 602, an agent platform 606, a historical information engine 618, a CRM engine 614, a data analysis engine 654, and an interaction engine 662.

The user device 602 is an example of a user device 120. The user device 602 includes an operating system (OS), a global navigation satellite system (GNSS) receiver, a network connection, and an internet protocol (IP) address to use over the network. The user device 602 runs one or more apps 604, which can include apps that associated with, and/or that communicate with, the agent platform 606, the historical information engine 618, the CRM engine 614, the data analysis engine 654, and an interaction engine 662. In some aspects, at least one of the apps 604 is an example of the user front-end 202. In some aspects, the user front-end 202 is an example of at least one of the apps 604.

In some aspects, the agent platform 606 is an example of the agent back-end 210. In some aspects, the agent back-end 210 is an example of the agent platform 606. The agent platform 606 includes agent devices 608, which may correspond to the agent devices 260. The agent platform 606 includes a concierge engine 610, which may connect a user using the user device 602 to a particular agent device 608 of an agent whose expertise and/or knowledge matches the subject matter of a query or request that the user of the user device 602 has expressed to the concierge engine 610. The concierge engine 610 may, for example, ask the user to state, through the user device 602 either verbally or through text, a reason for their call, message, or other form of communication with the agent. The concierge engine 610 can parse this reason and determine the subject matter of a query or request of the user of the user device 602.

The agent platform 606 includes an engagement AI/ML engine 612. The engagement AI/ML engine 612 can suggest, to agent devices 608 (e.g., to agents) information to request from the user, for instance in the form of questions. The data analysis engine 654 may make certain determinations about the user of the user device 602, for instance using the AI/ML engine 660. The engagement AI/ML engine 612 can be used to request feedback on these determinations. The user device 602 can provide the feedback to the agent platform 606 (e.g., to the agent device 608). In some cases, the feedback from the user device 602 can verify or approve of these determinations. The data analysis engine 654 can thus proceed with using these determinations further, for example to generate recommended transactions and/or recommended community as in FIGS. 5A-5B. In some cases, the feedback from the user device 602 can refute or disapprove of these determinations. The data analysis engine 654 can thus halt any further use of these determinations. Examples of the determinations include determinations as to intent for a transaction, as in operation 304, operation 310, operation 324, and/or determination of the predicted intent 460. Examples of the determinations include generation of a recommended transaction, as in operation 306, operation 312, operation 332, and/or generation of the recommended transaction 525. Examples of the determinations include determinations as to characteristics of the user, such as whether the user has a car, has a house, is in a relationship, is interested in a particular charity, has a particular political affiliation, and the like.

In some aspects, the historical information engine 618 is an example of the historical information sources 228. In some aspects, the historical information sources 228 are an example of the historical information engine 618. The historical information engine 618 includes historical information about the user of the user device 602, and in some cases about other users as well. The historical information engine 618 includes historical information associated with donations 620, including charities 622 that the user has donated to, a donation score 624 related to frequency of donations and/or quantity of assets (e.g., funds) donated, and/or reviews 626 of the user and/or of the charities related to the user's donations. The historical information engine 618 includes historical information associated with transactions 628 involving the user, including peer-to-peer (P2P) transactions 630 (e.g., from the user's to a transferee account, from a transferor account to the user's account), purchases 632 (e.g., from merchants, service providers, marketplaces, stores), rentals, leases, and the like. The historical information engine 618 includes historical information associated with accounts 634 of the user, including checking accounts 636, savings accounts 638, other accounts 640 (e.g., money market), and the like. The historical information engine 618 includes historical information associated with banking 642 by the user, including investments 644 (e.g., stocks, bonds, cryptocurrencies, NFTs, other digital assets), budgeting 646, and the like. The historical information engine 618 includes historical information associated with user identification 648 for the user, including preferences 650 (e.g., preferred name, preferred pronoun, prefer calls or messaging, etc.), user profile information 652 (e.g., name, address, phone number, email address, username, etc.), and the like.

In some aspects, the CRM Engine 614 is an example of the CRM Engine 226. In some aspects, the CRM Engine 226 is an example of the CRM Engine 614. The CRM Engine 614 can include conversational data 616 regarding conversation(s) between the user device 602 and agent device(s) 608 and any related data. The CRM Engine 614 can pull information for the conversational data 616 from the user device 602, the agent platform 606, the historical information engine 618, the data analysis engine 654, the interaction engine 662, or a combination thereof. The CRM Engine 614 can parse, reformat, normalize, and/or organize this information to generate the conversational data 616.

In some aspects, the data analysis engine 654 is an example of the automation engine 216. In some aspects, the automation engine 216 is an example of the data analysis engine 654. The data analysis engine 654 includes an operational database 656 that ingests information from the historical information engine 618 and the CRM engine 614 (e.g., the conversational data 616). The data analysis engine 654 includes a data lake 658 with vast quantities of data. The data analysis engine 654 can parse, reformat, normalize, and/or organize the information from the operational database 656, and can import the information from the operational database 656 into the data lake 658. The data lake 658 can include information about other users than the user. The information about the other users may include the same types of information as about the user (e.g., the types of information in the historical information engine 618, in the historical data sources 228, and/or in the CRM engine 614). The information about the other users may be anonymized by the data analysis engine 654 before entry into the data lake 658, in some examples.

The data analysis engine 654 includes an AI/ML engine 660 that receives data from the data lake 658 and/or the operational database 656 as input(s). The AI/ML engine 660 can generate determinations based on the receipt of the data from the data lake 658 and/or the operational database 656 as input(s). Examples of the determinations include determinations as to intent for a transaction, as in operation 304, operation 310, operation 324, and/or determination of the predicted intent 460. Examples of the determinations include generation of a recommended transaction, as in operation 306, operation 312, operation 332, and/or generation of the recommended transaction 525. Examples of the determinations include determinations as to characteristics of the user, such as whether the user has a car, has a house, is in a relationship, is interested in a particular charity, has a particular political affiliation, and the like.

Figure 14:
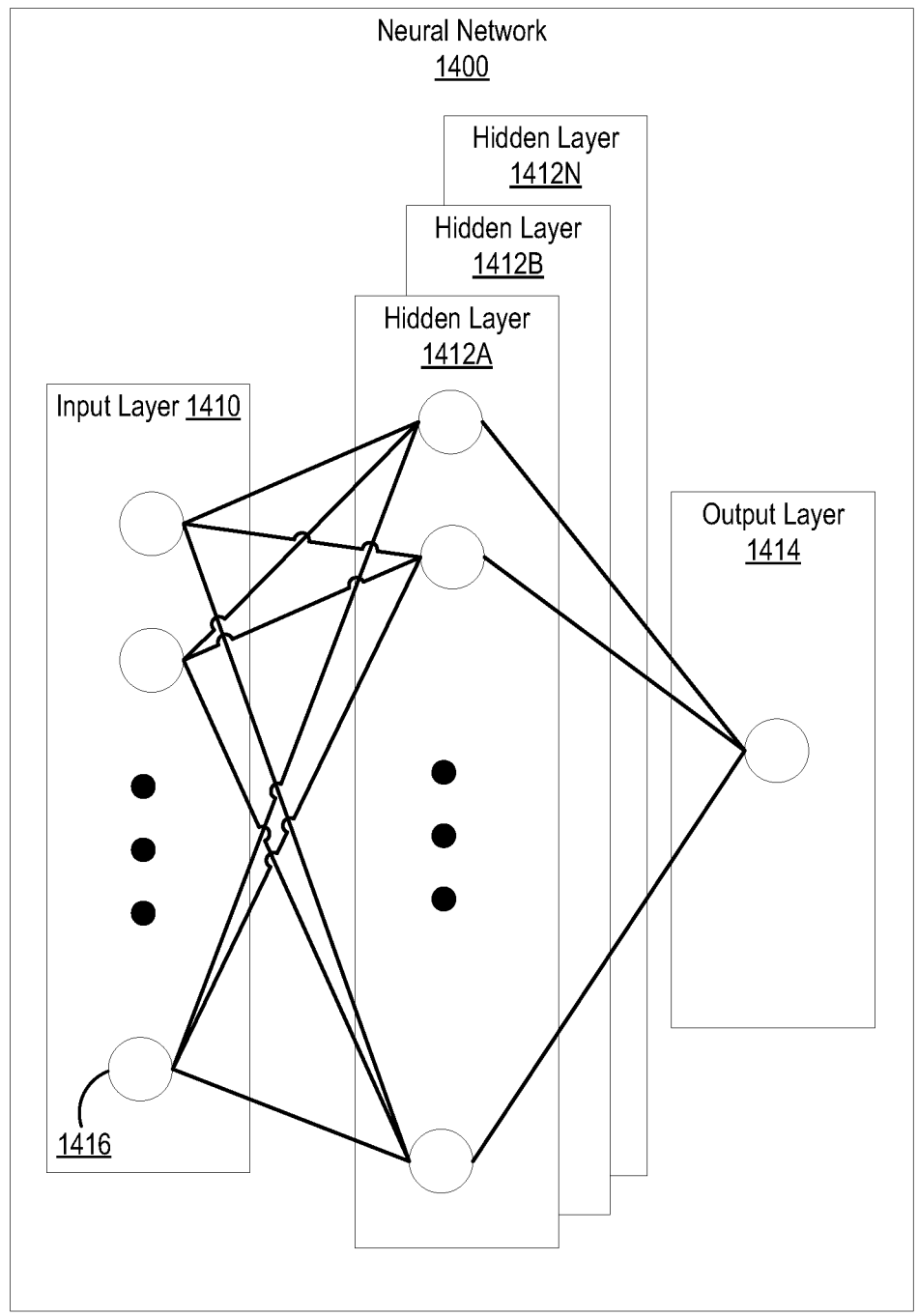
FIG. 14 is a block diagram illustrating an example of a neural network that can be used by a machine learning engine to determine intent for transactions and/or to generate recommended transactions, in accordance with some examples.

The AI/ML engine 660 can include, for example, the ML engine 248, the ML engine associated with the one or more trained machine learning models of operation 310 and/or operation 312 of FIG. 3B, the ML engine associated with the first trained ML model of at least one of operations 322-328 of FIG. 3C, the ML engine associated with the trained ML model of at least one of operations 330-334 of FIG. 3C, the ML engine 430, the neural network 1400 of FIG. 14, and combinations thereof.

The determinations generated by the AI/ML engine 660 based on the data from the data lake 658 and/or the operational database 656 can be received by, and/or used by, the interaction engine 662. The interaction engine 662 can provide services to the user of the user device 602, to agents associated with the agent devices 608, to financial entities, and/or to entities. For instance, the interaction engine 662 includes a loan credit service 664, an emergency fund service 666, a financial planning service 668, a fraud protection service 670, an offers service 672, a financial automation service 674, and an enhanced interactions service 676.

The interaction engine 662 includes a loan credit service 664 that can provide credit products such as credit cards, mortgages, or loans. For the loan credit service 664, the AI/ML engine 660 can generate a determination as to creditworthiness for a credit product based on the data from the data lake 658 and/or the operational database 656. The interaction engine 662 includes an emergency fund service 666 that can quickly loan or provide emergency funds to users in urgent need (e.g., due to a natural disaster or serious accident). For the emergency fund service 666, the AI/ML engine 660 can generate a determination as to whether a user is in an emergency and/or in urgent need and should receive funds from the emergency fund service 666 based on the data from the data lake 658 and/or the operational database 656. The interaction engine 662 includes a financial planning service 668 that can provide financial planning for users. For the financial planning service 668, the AI/ML engine 660 can generate at least a portion of a financial plan for a user based on the data from the data lake 658 and/or the operational database 656.

The interaction engine 662 includes a fraud protection service 670 that can prevent fraud. For the fraud protection service 670, the AI/ML engine 660 can generate a determination as to whether or not a transaction attempt and/or login attempt is fraudulent or authorized based on the data from the data lake 658 and/or the operational database 656. The interaction engine 662 includes an offers service 672 that can provide offers for users, such as coupons, discounts, and rebates. For the offers service 672, the AI/ML engine 660 can generate a determination as to whether the user is eligible for any offers based on the data from the data lake 658 and/or the operational database 656.

The interaction engine 662 includes a financial automation service 674 that can automate certain periodic financial tasks for the user. For the financial automation service 674, the AI/ML engine 660 can identify periodic financial tasks that the user performs, and that can be automated using the financial automation service 674, based on the data from the data lake 658 and/or the operational database 656. The interaction engine 662 includes an enhanced interactions service 676 that can provide enhanced interactions, such as recommended transactions based on user intent. For the enhanced interactions service 676, the AI/ML engine 660 can determine user intent and/or generate a recommended transaction based on the data from the data lake 658 and/or the operational database 656.

In some cases, the CRM engine 614 can receive and store the determinations made by the AI/ML engine 660 for the various services 664-676 of the interaction engine 662 as part of the conversational data 616 of the CRM engine 614.

Figure 7:
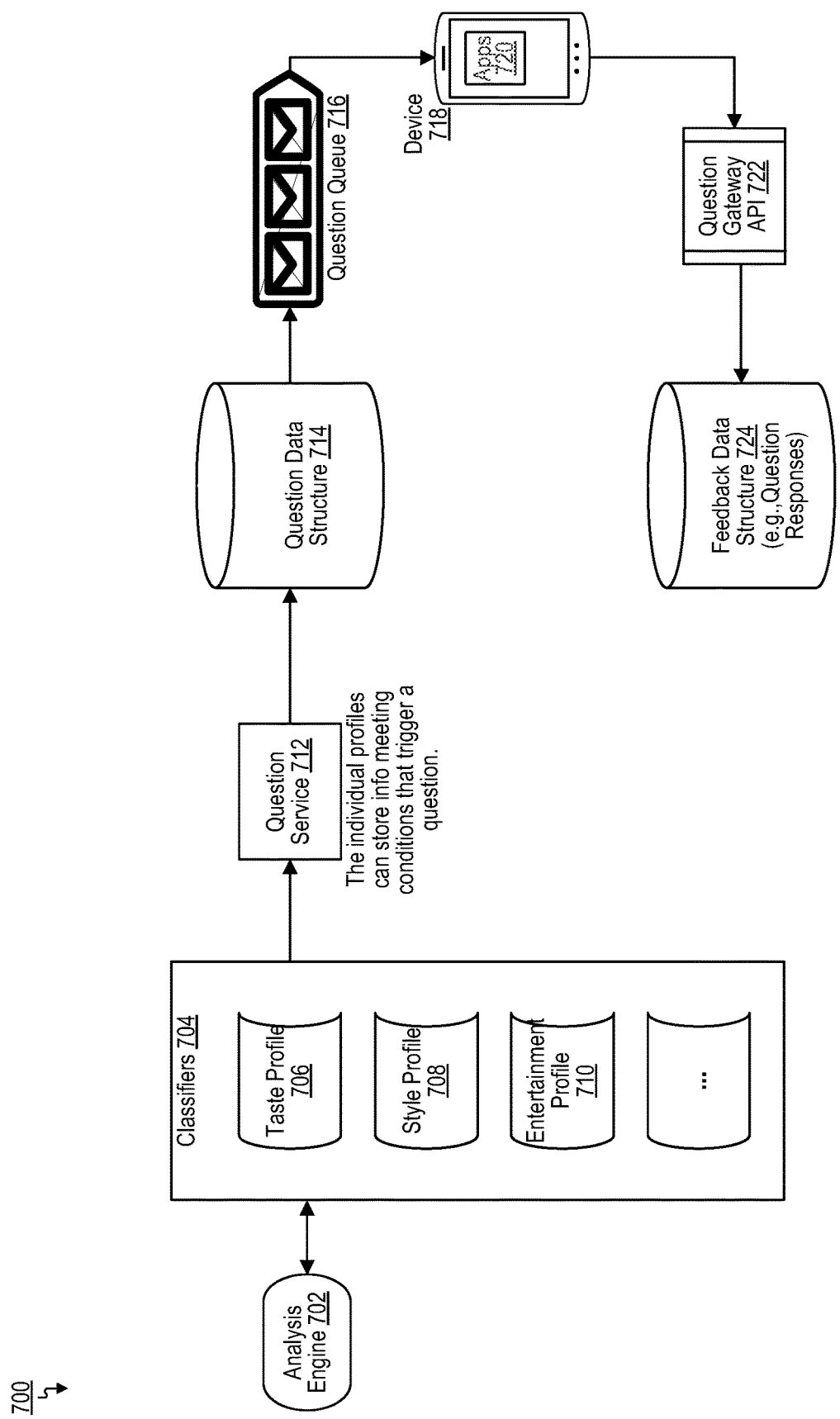
FIG. 7 is a block diagram illustrating a process for requesting feedback from a user, in accordance with some examples.

FIG. 7 is a block diagram 700 illustrating a process for requesting feedback from a user. An analysis engine 702 can make a determination about a user. The analysis engine 702 can include, for example, the one or more account automation servers 130, the one or more account management servers 140, the one or more account automation data structures 135, the one or more account management data structures 145, the automation engine 216, the cloud computing engine 244, the account management system(s) of FIGS. 3A-3C, the ML engine 430, the data analysis engine 654, the CRM engine 614, the interaction engine 662, the analysis engine 910, the AI/ML engine 925, the analysis engine 1004, the classifiers 1010, the profile data structure 1024, neural network 1400, the computing system 1500, the processor 1510, or a combination thereof. Examples of the determinations include determinations as to intent for a transaction, as in operation 304, operation 310, operation 324, and/or determination of the predicted intent 460. Examples of the determinations include generation of a recommended transaction, as in operation 306, operation 312, operation 332, and/or generation of the recommended transaction 525. Examples of the determinations include determinations as to characteristics of the user, such as whether the user has a car, has a house, is in a relationship, is interested in a particular charity, has a particular political affiliation, and the like.

The analysis engine 702 can generate various profiles for the user based on the various determinations. The profiles may be based on the intents determined for various transactions, as in the determination of the predicted intent 460 of FIG. 4. The analysis engine 702 can generate recommended transactions and/or recommended communities, as in FIGS. 5A-5B, based on these profiles instead of or in addition to being based on the intent 505. For instance, the analysis engine 702 can provide information from one or more of these profiles in place of the intent 505 as one or more inputs to the one or more ML models 435 to generate the recommended transaction 525. The analysis engine 702 can classify determinations as to different aspects of the user into the appropriate profile using the classifier(s) 704.

For instance, the profiles include a taste profile 706 that the analysis engine 702 can pull data from to use as input(s) to the one or more ML models 435 to generate recommended transactions related to restaurants, dishes, food items, meals, beverages, cooking, grocery shopping, and the like. The profiles include a style profile 708 that the analysis engine 702 can pull data from to use as input(s) to the one or more ML models 435 to generate recommended transactions related to clothing, fashion, style, and the like. The profiles include an entertainment profile 710 that the analysis engine 702 can pull data from to use as input(s) to the one or more ML models 435 to generate recommended transactions related to movies, television, video games, art, music, and the like. In some examples, the taste profile 706, the style profile 708, the entertainment profile 710, and other similar profiles can correspond to transactions that the user is involved in, offers that the user has purchased, communities (online or otherwise) that the user has joined or is otherwise involved in, or a combination thereof.

In some examples, one or more of the profiles store information meeting conditions that trigger a question. The question service 712 can determine the question. For example, is a determination about the user has been determined by the analysis engine 702 with a low confidence or probability, the question service 712 can seek to approve or refute the determination via a question that the question service 712 generates to ask the user if the determination is correct. The question service 712 can store the question in a question data structure 714. From the question data structure 714, the question can be sorted into a question queue 716. In some examples, questions may be entered into the question queue 716 in a first-in first-out (FIFO) order. In some examples, questions may be sorted in the question queue 716 by priority or weight, with some questions (e.g., more urgent or important questions) being higher priority or having higher weight than others. For instance, a medical question such as "are you allergic to peanuts?" may be ranked as a higher priority, higher weight, and/or higher urgency than a stylistic question such as "is your favorite color blue?"

The question queue 716 may be part of a functionality of an app 720 running on the device 718. In some examples, the device 718 is an example of the user device 120 and/or the user device 602. In some examples, the device 718 is an example of the agent device 260 and/or the agent device 608. The question queue 716 may be generated, sorted, and/or asked locally by the device 718 in the course of the device 718 running the app 720. The question queue 716 may be generated, sorted, and/or asked remotely by a server (e.g., the analysis engine 702) by request from the device 718 in the course of the device 718 running the app 720.

A question gateway API 772 may be used to send and/or ask the question to the user via the user device (e.g., user device 120 and/or user device 602), and/or to receive and/or record feedback from the user in response to the question. The feedback may be stored, by analysis engine 702 and/or by the device 718, in a feedback data structure 724. The feedback may include, for example, the confirmation of operations 316-318, the first feedback of operation 328, the second feedback of operation 334, the feedback 450, and/or the feedback 550.

Figure 8:
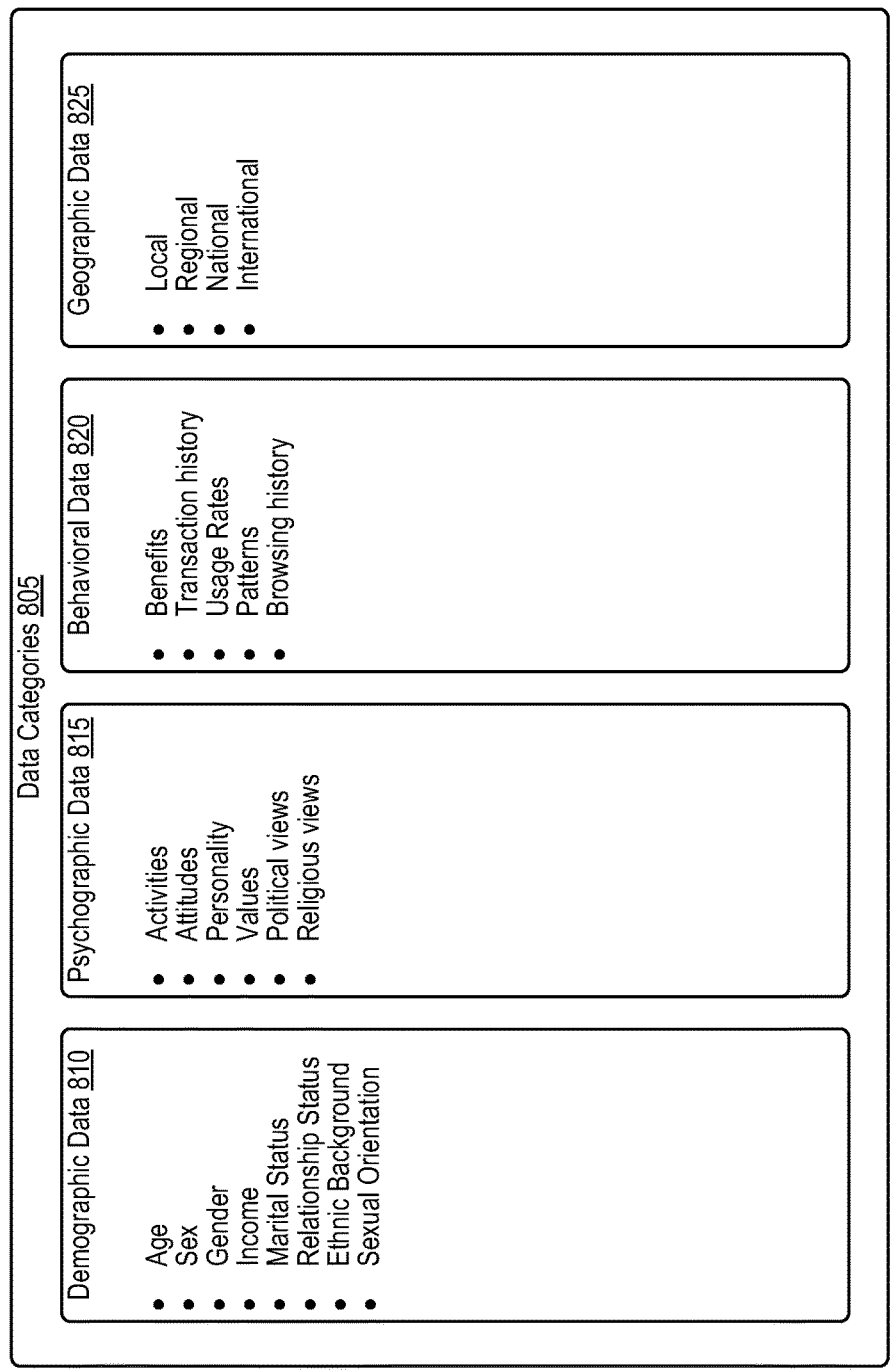
FIG. 8 is a block diagram illustrating exemplary of data categories of historical data about users, in accordance with some examples.

FIG. 8 is a block diagram 800 illustrating exemplary of data categories 805 of historical data about users. The data categories 805 include demographic data 810, psychographic data 815, behavioral data 820, and geographic data 825. Demographic data 810 includes, for instance, age, sex, gender, income, marital status, relationship status, ethnic background, and/or sexual orientation. Psychographic data 815 includes, for instance, activities, attitudes, personality, values, political views, and/or religious views. Behavioral data 820 includes, for example, benefits, transaction history, usage rates, patterns, and/or browsing history. Geographic data 825 includes, for example, local data, regional data, national data, and/or international data. The data categories 805 can correspond to transactions that the user is involved in, offers that the user has purchased, communities (online or otherwise) that the user has joined or is otherwise involved in, or a combination thereof.

Figure 9:
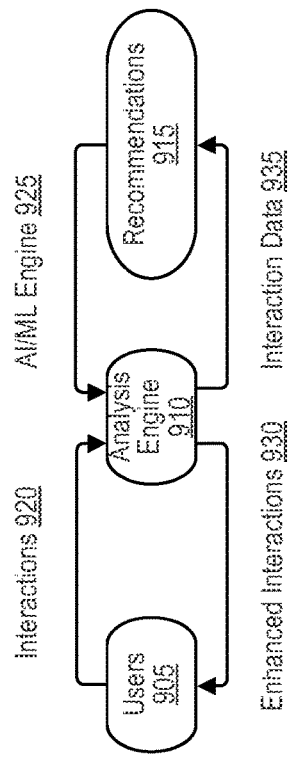
FIG. 9 is a block diagram illustrating generation of recommendations for users by an analysis engine based on interactions, in accordance with some examples.

FIG. 9 is a block diagram 900 illustrating generation of recommendations 915 for users 905 by an analysis engine 910 based on interactions 920. The analysis engine 910 includes an AI/ML engine 925.

Examples of the AI/ML engine 925 include the ML engine 248, the ML engine associated with the one or more trained machine learning models of operation 310 and/or operation 312 of FIG. 3B, the ML engine associated with the first trained ML model of at least one of operations 322-328 of FIG. 3C, the ML engine associated with the trained ML model of at least one of operations 330-334 of FIG. 3C, the ML engine 430, the engagement AI/ML engine 612, the AI/ML engine 660, the neural network 1400 of FIG. 14, and combinations thereof.

The users 905 are users of user devices 120. The users 905 perform interactions 920 with other users and/or with merchants, service providers, financial institutions, and the like. The interactions 920 can include transactions. The analysis engine 910 receives indications of the interactions 920 from the user devices 120, from devices of other uses, from devices of merchants, from devices of service providers, from devices of financial institutions, or a combination thereof.

The analysis engine 910 can include, for example, the one or more account automation servers 130, the one or more account management servers 140, the one or more account automation data structures 135, the one or more account management data structures 145, the automation engine 216, the cloud computing engine 244, the account management system(s) of FIGS. 3A-3C, the ML engine 430, the data analysis engine 654, the CRM engine 614, the interaction engine 662, the analysis engine 702, the AI/ML engine 925, the analysis engine 1004, the classifiers 1010, the profile data structure 1024, neural network 1400, the computing system 1500, the processor 1510, or a combination thereof.

The analysis engine 910 generates the recommendations 915 for transactions, offers, and/or communities based on interaction data 935 from the interactions 920. Generation of the recommendations 915 by the analysis engine 910 can include generation of a recommended transaction, as in operation 306, operation 312, operation 332, and/or generation of the recommended transaction 525. Generation of the recommendations 915 by the analysis engine 910 can include generation of a recommended community, as in the generation of the recommended community 560. The recommendations 915 can be used by the analysis engine to provide enhanced interactions 930 for users 905. The enhanced interactions 930 can include interactions and/or services described with respect to the interaction engine 662, such as the loan credit service 664, the emergency fund service 666, a financial planning service 668, the fraud protection service 670, the offers service 672, the financial automation service 674, and the enhanced interactions service 676.

Figure 10:
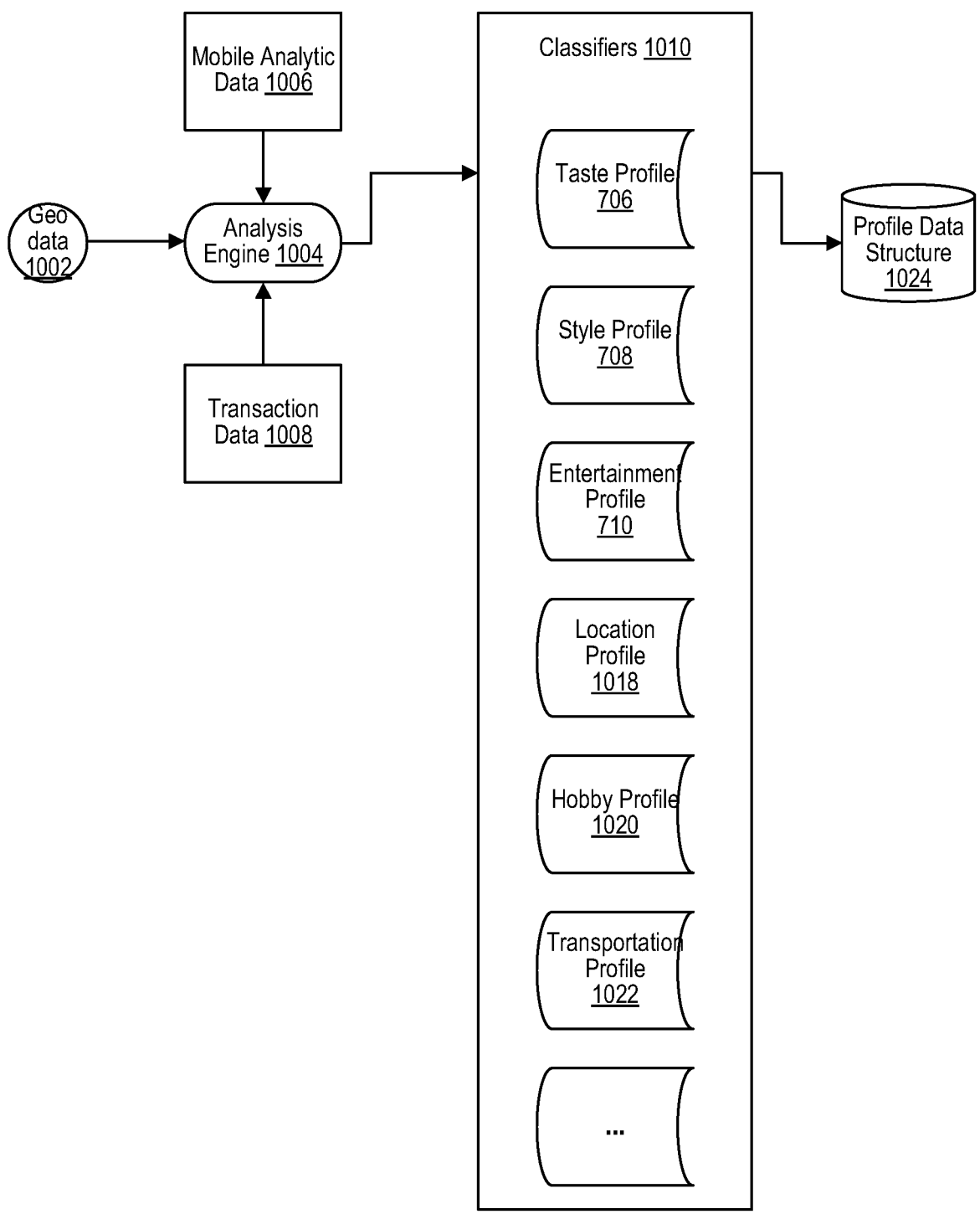
FIG. 10 is a block diagram illustrating generation of profiles associated with a user by one or more classifiers, in accordance with some examples.

FIG. 10 is a block diagram 1000 illustrating generation of profiles associated with a user by one or more classifiers 1010. An analysis engine 1004 can make a determination about a user, for instance based on geographic data 1002, mobile analytic data 1006, and/or transaction data 1008. The analysis engine 1004 can include, for example, the one or more account automation servers 130, the one or more account management servers 140, the one or more account automation data structures 135, the one or more account management data structures 145, the automation engine 216, the cloud computing engine 244, the account management system(s) of FIGS. 3A-3C, the ML engine 430, the data analysis engine 654, the CRM engine 614, the interaction engine 662, the analysis engine 702, the classifiers 704, the analysis engine 910, the AI/ML engine 925, the neural network 1400, the computing system 1500, the processor 1510, or a combination thereof. Examples of the determinations include determinations as to intent for a transaction, as in operation 304, operation 310, operation 324, and/or determination of the predicted intent 460. Examples of the determinations include generation of a recommended transaction, as in operation 306, operation 312, operation 332, and/or generation of the recommended transaction 525. Examples of the determinations include determinations as to characteristics of the user, such as whether the user has a car, has a house, is in a relationship, is interested in a particular charity, has a particular political affiliation, and the like.

The analysis engine 1004 can generate various profiles for the user based on the various determinations. The analysis engine 1004 can generate recommended transactions and/or recommended communities, similarly to FIGS. 5A-5B, based on these profiles. For instance, the analysis engine 1004 can provide information from one or more of these profiles in place of the intent 505 as one or more inputs to the one or more ML models 435 to generate the recommended transaction 525 and/or recommended community 560. The analysis engine 1004 can classify determinations as to different aspects of the user into the appropriate profile using the classifier(s) 704.

As in FIG. 7, the profiles of FIG. 10 include a taste profile 706 that the analysis engine 1004 can pull data from to use as input(s) to the one or more ML models 435 to generate recommended transactions related to restaurants, dishes, food items, meals, beverages, cooking, grocery shopping, and the like. The profiles include a style profile 708 that the analysis engine 1004 can pull data from to use as input(s) to the one or more ML models 435 to generate recommended transactions related to clothing, fashion, style, and the like. The profiles include an entertainment profile 710 that the analysis engine 1004 can pull data from to use as input(s) to the one or more ML models 435 to generate recommended transactions related to movies, television, video games, art, music, and the like.

The profiles of FIG. 10 also include a location profile 1018 that the analysis engine 1004 can pull data from to use as input(s) to the one or more ML models 435 to generate recommended transactions related to travel locations, home locations, vacation destinations, and the like. The profiles also include a hobby profile 1020 that the analysis engine 1004 can pull data from to use as input(s) to the one or more ML models 435 to generate recommended transactions related to hobbies. The profiles also include a hobby profile 1022 that the analysis engine 1004 can pull data from to use as input(s) to the one or more ML models 435 to generate recommended transactions related to transportation preferences (e.g., car, walk, bike, train, plane), ridesharing service, public transit service, and the like. The analysis engine 1004 can store the profiles in a profile data structure 1024.

In some examples, the taste profile 706, the style profile 708, the entertainment profile 710, the location profile 1018, the hobby profile 1020, the transportation profile 1022, and other similar profiles can correspond to transactions that the user is involved in, offers that the user has purchased, communities (online or otherwise) that the user has joined or is otherwise involved in, or a combination thereof.

Figure 11:
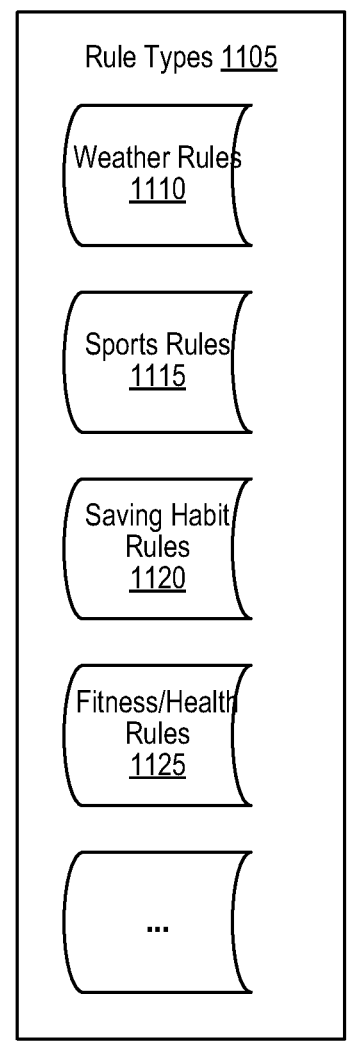
FIG. 11 is a block diagram illustrating rule types associated with the rules engine, in accordance with some examples.

FIG. 11 is a block diagram 1100 illustrating rule types associated with the rules engine 218. The rule types include weather rules 1110, sports rules 1115, saving habit rules 1120, fitness/health rules 1125, and the like.

The weather rules 1110 can encourage some types of transactions to be used as recommended transactions in certain types of weather, while discouraging or prohibiting other types of transactions to be used as recommended transactions during the same types of weather. For instance, if the automation engine 216 identifies that the weather is currently raining heavily in the region that the user is in, the weather rules 1110 can encourage transactions for umbrellas for the recommended transactions, while discouraging or prohibiting transactions for steep hiking trails.

The sports rules 1115 can encourage some types of transactions to be used as recommended transactions based on the user's sports preferences, while discouraging or prohibiting other types of transactions to be used as recommended transactions based on the user's sports preferences. For instance, if the automation engine 216 identifies that the user is a fan of a particular sports team, the sports rules 1115 can encourage recommended transactions related to that sports team, and can discourage recommended transactions related to rival sports teams.

The saving habit rules 1120 can encourage some types of transactions to be used as recommended transactions based on the user's saving habits, while discouraging or prohibiting other types of transactions to be used as recommended transactions based on the user's saving habits. For instance, if the automation engine 216 identifies that the user is very frugal, the saving habit rules 1120 can encourage recommended transactions related to more affordable, and can discourage recommended transactions that are extravagant.

The fitness/health rules 1125 can encourage some types of transactions to be used as recommended transactions based on the user's fitness/health habits, while discouraging or prohibiting other types of transactions to be used as recommended transactions based on the user's fitness/health habits. For instance, if the automation engine 216 identifies that the user is very fit, the fitness/health rules 1125 can encourage recommended transactions related to fitness activities and/or healthy food, and can discourage recommended transactions that are related to sedentary activities and/or junk food.

In some examples, the weather rules 1110, the sports rules 1115, the saving habit rules 1120, the fitness/health rules 1125, and other similar rulesets can correspond to transactions that the user is involved in, offers that the user has purchased, communities (online or otherwise) that the user has joined or is otherwise involved in, or a combination thereof.

Figure 12:
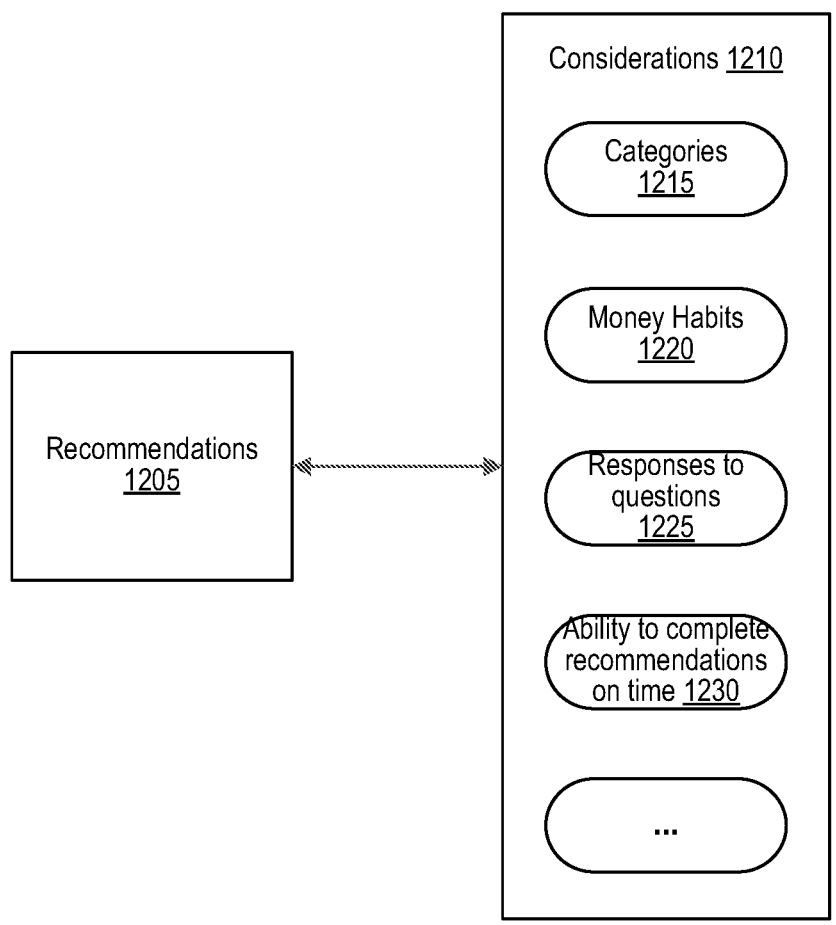
FIG. 12 is a block diagram illustrating considerations for generating recommendations, in accordance with some examples.

FIG. 12 is a block diagram 1200 illustrating considerations 1210 for generating recommendations 1205. In some examples, the recommendations 1205 include recommended transactions 525, recommended communities 560, recommended offers, and/or other recommendations. The considerations 1210 can include categories 1215 of transactions, money habits 1220 of the user (e.g., as in the saving habit rules 1120), responses to questions or suggestions 1225 (e.g., feedback as in FIG. 7), ability of the user to complete actions associated with the recommendations on time 1230, or combinations thereof. In some examples, the categories 1215 of transactions, money habits 1220 of the user (e.g., as in the saving habit rules 1120), responses to questions or suggestions 1225 (e.g., feedback as in FIG. 7), ability of the user to complete actions associated with the recommendations on time 1230, and other considerations 1210 can correspond to transactions that the user is involved in, offers that the user has purchased, communities (online or otherwise) that the user has joined or is otherwise involved in, or a combination thereof.

Figure 13:
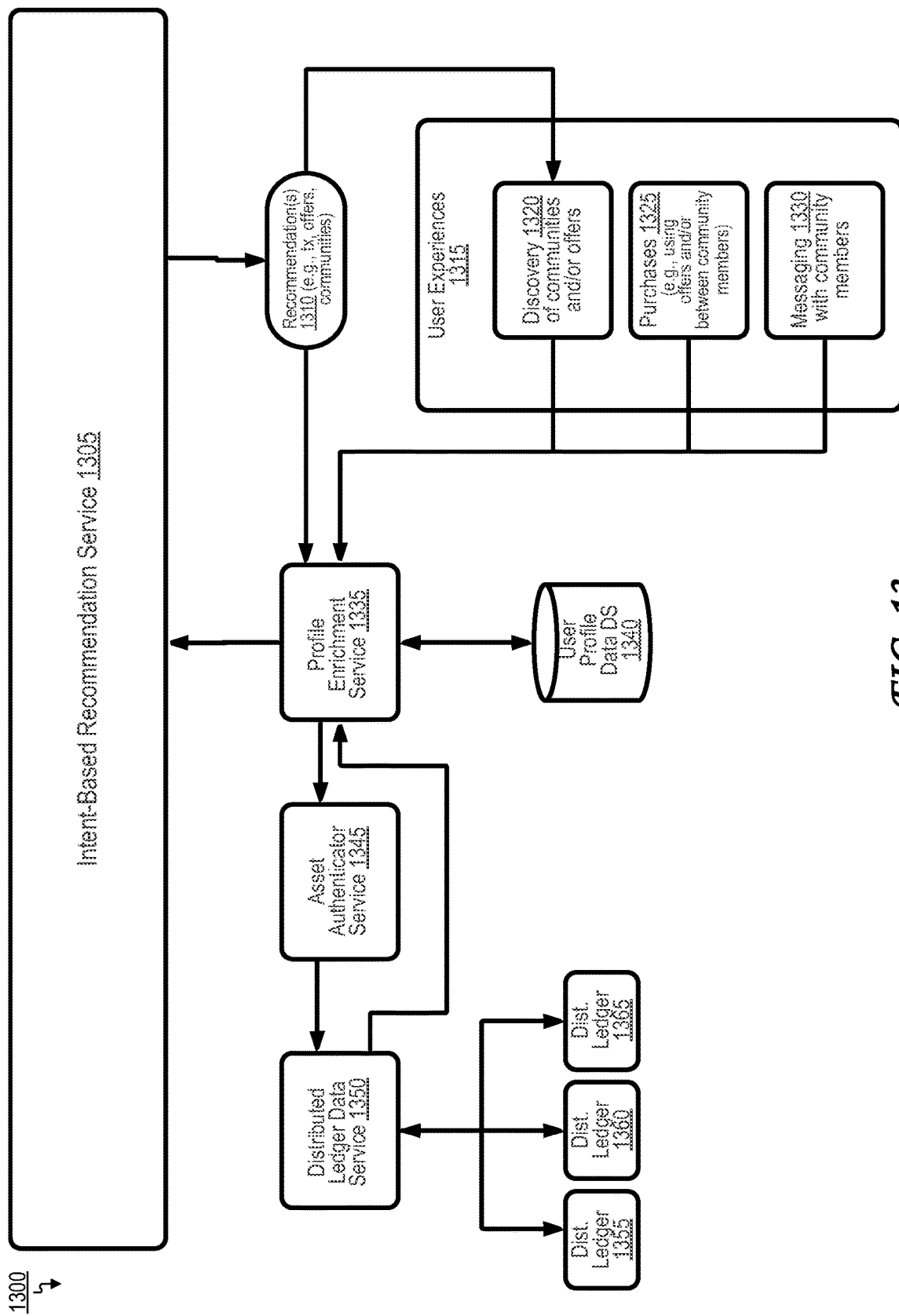
FIG. 13 is a block diagram illustrating a system architecture of a system that provides intent-based recommendations, in accordance with some examples.

FIG. 13 is a block diagram 1300 illustrating a system architecture of a system that provides intent-based recommendations. The system includes an intent-based recommendation service 1305 that is configured to generate one or more intent-based recommendation(s) 1310, for instance as discussed with respect to the processes 300A-300C of FIGS. 3A-3C and/or otherwise herein. The recommendation(s) 1310 can recommend communities, offers, or combinations thereof to a user of the system based on an intent of the user (e.g., as determined based on previous transaction(s) and/or other activity by the user).

The system provides various user experiences 1315 to users, such as discovery 1320 of communities and/or offers, purchases 1325 (e.g., using the offers and/or between community members), messaging 1330 with community members. A user can interface with the system's discovery user interface(s) to view various communities, community-specific offerings, and activity of by other users of the system (e.g., dynamically in real-time or near-real-time). A user can select any community or offer in the recommendation(s) 1310 to further the user's engagement with the community or offer, for instance to learn more about the recommended community or offer, to conduct further discovery 1320, to engage in messaging 1330, to make purchases 1325, and the like. In some examples, the system can also provide an interface of the user through which the user can view the intent-based recommendation service 1305's logic behind particular recommendation(s) 1310, such as what intent the intent-based recommendation service 1305 determined the user to have, what data the intent-based recommendation service 1305 used to determine the user's intent, and the like. In this way, the system can provide the user with further transparency and awareness. In some examples, the user's data that are used by the intent-based recommendation service 1305 to determine the user's intent may be stored in the user profile data data store (DS) 1340. The user profile data DS 1340 may also be updated using a profile enrichment service 1335 to store the user's interactions with recommendation(s) 1310 provided by the intent-based recommendation service 1305, which may in turn influence future determinations of the user's intent and future recommendation(s) 1310 for the user by the intent-based recommendation service 1305. The profile enrichment service 1335 may track these interactions and edit the user profile data DS 1340, and may initiate further updates to the trained ML model(s) 435 of the intent-based recommendation service 1305 using the new data in the user profile data DS 1340 (in some cases with the recommendation(s) 1310 that the user is interacting with) as training data. These updates to the trained ML model(s) 435 can refine future recommendation(s) 1310.

In some examples, the user profile data DS 1340 can store various actions that a user takes, such as interactions with various communities, purchases, offers, and/or recommendation(s) 1310. For instance, the user profile data DS 1340 can store a user identifiers, a name, a phone number, an address, an email address, a wallet hash for a digital wallet (e.g., for a cryptocurrency wallet or a web3 wallet) associated with the user, data from at least one distributed ledger (e.g., a blockchain ledger or a DAG ledger) associated with the user and/or the wallet hash, user behavioral data, communities joined by the user, assets purchased or sold by the user, the user's activity within different communities, what was recommended in intent-based recommendation(s) 1310 provided to the user, how a user interacted with intent-based recommendation(s) 1310 provided to the user (e.g., were the recommendation(s) 1310 viewed or selected, did the user make a recommended purchase or join a recommended community, did the user message within the recommended community), types of assets purchased and/or owned by the user, stage of investments by the user (e.g., early or late stage), user preferences or affinities (e.g., sports, fine art, street art, fashion, etc.), average purchase price of assets purchased by the user, length of time asset(s) are held by the user after purchase (e.g., is the user a long-term supporter or a short-term asset flipper), types of communities joined, how active a user is within each community, frequency of usage of different assets and/or services, other user data described herein, or a combination thereof.

The profile enrichment service 1335 is configured to capture user-specific data and route the data accordingly. In some examples, the profile enrichment service 1335 can capture user behavior data (and other forms of user data described above) from interface(s) between the intent-based recommendation service 1305 and the user (e.g., including from interfaces corresponding to the recommendation(s) 1310) to capture user behavior data (and other forms of user data described above) and route the data to be stored in the user profile data DS 1340. In some examples, the profile enrichment service 1335 can capture user behavior data (and other forms of user data described above) from the user profile data DSs 1340. In some examples, the profile enrichment service 1335 can access data from various distributed ledgers (e.g., via the distributed ledger data service 1350 and/or the asset authenticator service 1345), such as a distributed ledger 1355, a distributed ledger 1360, and a distributed ledger 1365. The profile enrichment service 1335 can store the data from the distributed ledger(s) in the user profile data DS 1340 and/or use the data for training and/or updating the trained ML model(s) 435. The profile enrichment service 1335 can store any generated recommendation(s) 1310, and/or information about any user interactions therewith, in the user profile data DS 1340 and/or use the data for training and/or updating the trained ML model(s) 435. In some examples, some user experiences 1315 in the system (e.g., discovery 1320, purchases 1325, and/or messaging 1330) by the user can trigger the profile enrichment service 1335 to interact with the intent-based recommendation service 1305 to generate new recommendation(s) 1310 for the user.

The profile enrichment service 1335 can interact with an asset authenticator service 1345 and/or distributed ledger service 1350, for instance to receive updated distributed ledger data from one or more distributed ledgers, such as the distributed ledger 1355, the distributed ledger 1360, and/or the distributed ledger 1365. Each of these distributed ledgers may be blockchain ledgers, DAG ledgers, hashgraph ledgers, private ledgers, public ledgers, permissioned ledgers, permissionless ledgers, or a combination thereof. The asset authenticator service 1345 receives a digital wallet hash of a digital wallet (e.g., a cryptocurrency wallet and/or a web3 wallet) associated with a user, and/or a user-specific authentication token. The asset authenticator service 1345 uses the digital wallet hash and/or the authentication token to ensure that a specified user is the true owner of a digital wallet. Once the asset authenticator service 1345 authenticates ownership of the digital wallet, information regarding the assets within the wallet and/or the wallet hash are sent from the asset authenticator service 1345 to the distributed ledger service 1350.

The distributed ledger service 1350 pulls current data and/or historical data from one or more distributed ledgers (e.g., the distributed ledger 1355, the distributed ledger 1360, and/or the distributed ledger 1365) that are relevant to the digital wallet associated with a user. Examples of the distributed ledgers include Ethereum, Polygon, Bitcoin, Solana, and/or other distributed ledger types. The information queried and/or retrieved by the distributed ledger service 1350 is sent from the distributed ledger service 1350 to the asset authenticator service 1345, the profile enrichment service 1335, and/or the user data DS 1340, and can be used to update training of the trained ML model(s) 435 to enhance future recommendation(s) 1310.

The intent-based recommendation service 1305 can use user-specific profile data (e.g., from the user profile data DS 1340 and/or from various distributed ledger(s) as described herein) to output personalized and user-relevant recommendation(s) 1310 regarding communities for the user to join, transactions for the user to participate in, and/or offers for the user to purchase. The intent-based recommendation service 1305 can generate the recommendation(s) 1310 dynamically in real-time (or near-real-time) as further user-specific profile data is received, for instance as the user interacts with other recommendations, as the user interacts with communities, as the user participates in transactions, as the user purchases offers, and the like. The intent-based recommendation service 1305 can use the user-specific profile data (e.g., from the user profile data DS 1340 and/or from various distributed ledger(s) as described herein) to train and/or update the trained ML model(s) 435 that the intent-based recommendation service 1305 uses to determine intent (e.g., the predicted intent 460) and/or to generate the recommendation(s) 1310. The recommended transactions of FIGS. 3A-3C, the recommended transaction 535, and the recommended community 560 are examples of the recommendation(s) 1310. In some examples, a user can automatically receive a reward (e.g., an asset) for interacting with the recommendation(s) 1310, for instance by joining a recommended community, purchasing a recommended offer, or participating in a recommended transaction.

FIG. 14 is a block diagram illustrating an example of a neural network (NN) 1400 that can be used by a machine learning engine to determine intent for transactions and/or to generate recommended transactions, recommended communities, and/or recommended offers. Examples of the machine learning engine and/or the NN 1400 include the ML engine 248, the ML engine associated with the one or more trained machine learning models of operation 310 and operation 312 of FIG. 3B, the ML engine associated with the first trained ML model of operations 322-328 of FIG. 3C, the ML engine associated with the trained ML model of operations 330-334 of FIG. 3C, the ML engine 430 of FIGS. 4 and 5A-5B, the engagement AI/ML engine 612, the AI/ML engine 660, the AI/ML engine 925, and combinations thereof. The neural network 1400 can include any type of deep network, such as a convolutional neural network (CNN), an autoencoder, a deep belief net (DBN), a Recurrent Neural Network (RNN), a Generative Adversarial Networks (GAN), and/or other type of neural network.

Examples of the determinations as to intent for a transaction using the NN 1400 include operation 304, operation 310, operation 324, and/or determination of the predicted intent 460. Examples of the generation of a recommended transaction, recommended community, and/or recommended offer using the NN 1400 include operation 306, operation 312, operation 332, generation of the recommended transaction 525, generation of the recommended community 560, generation of the recommendations 1205, and/or generation of the recommendation(s) 1310. Examples of other determinations made using the NN 1400 include determinations as to characteristics of the user, such as whether the user has a car, has a house, is in a relationship, is interested in a particular charity, has a particular political affiliation, and the like.

An input layer 1410 of the neural network 1400 includes input data. The input data of the input layer 1410 can include data representing, for example, historical information 405 about a user 410 that identifies a first transaction 415, intent 505 for the first transaction 415, data from the data lake 658, data from the operational database 656, or a combination thereof. In an illustrative example, the input data of the input layer 1410 can include data representing the historical information 405 about a user 410 that identifies a first transaction 415. In another illustrative example, the input data of the input layer 1410 can include data representing the intent 505 for the first transaction 415. In another illustrative example, the input data of the input layer 1410 can include data representing the intent 575 for the first community 580.

The neural network 1400 includes multiple hidden layers 1412A, 1412B, through 1412N. The hidden layers 1412A, 1412B, through 1412N include "N" number of hidden layers, where "N" is an integer greater than or equal to one. The number of hidden layers can be made to include as many layers as needed for the given application. The neural network 1400 further includes an output layer 1414 that provides an output resulting from the processing performed by the hidden layers 1412A, 1412B, through 1412N. In some examples, the output layer 1414 can provide a predicted intent 460 for the first transaction 415, a recommended transaction 525, a recommended community 506, a determination as to a characteristic of the user, a determination associated with one of the services of the interaction engine 662, a determination associated with one of the profiles 706-710 and/or 1018-1022, another determination, or a combination thereof.

The neural network 1400 is a multi-layer neural network of interconnected filters. Each filter can be trained to learn a feature representative of the input data. Information associated with the filters is shared among the different layers and each layer retains information as information is processed. In some cases, the neural network 1400 can include a feed-forward network, in which case there are no feedback connections where outputs of the network are fed back into itself. In some cases, the network 1400 can include a recurrent neural network, which can have loops that allow information to be carried across nodes while reading in input.

In some cases, information can be exchanged between the layers through node-to-node interconnections between the various layers. In some cases, the network can include a convolutional neural network, which may not link every node in one layer to every other node in the next layer. In networks where information is exchanged between layers, nodes of the input layer 1410 can activate a set of nodes in the first hidden layer 1412A. For example, as shown, each of the input nodes of the input layer 1410 can be connected to each of the nodes of the first hidden layer 1412A. The nodes of a hidden layer can transform the information of each input node by applying activation functions (e.g., filters) to this information. The information derived from the transformation can then be passed to and can activate the nodes of the next hidden layer 1412B, which can perform their own designated functions. Example functions include convolutional functions, downscaling, upscaling, data transformation, and/or any other suitable functions. The output of the hidden layer 1412B can then activate nodes of the next hidden layer, and so on. The output of the last hidden layer 1412N can activate one or more nodes of the output layer 1414, which provides a processed output image. In some cases, while nodes (e.g., node 1416) in the neural network 1400 are shown as having multiple output lines, a node has a single output and all lines shown as being output from a node represent the same output value.

In some cases, each node or interconnection between nodes can have a weight that is a set of parameters derived from the training of the neural network 1400. For example, an interconnection between nodes can represent a piece of information learned about the interconnected nodes. The interconnection can have a tunable numeric weight that can be tuned (e.g., based on a training dataset), allowing the neural network 1400 to be adaptive to inputs and able to learn as more and more data is processed.

The neural network 1400 is pre-trained to process the features from the data in the input layer 1410 using the different hidden layers 1412A, 1412B, through 1412N in order to provide the output through the output layer 1414.

Figure 15:
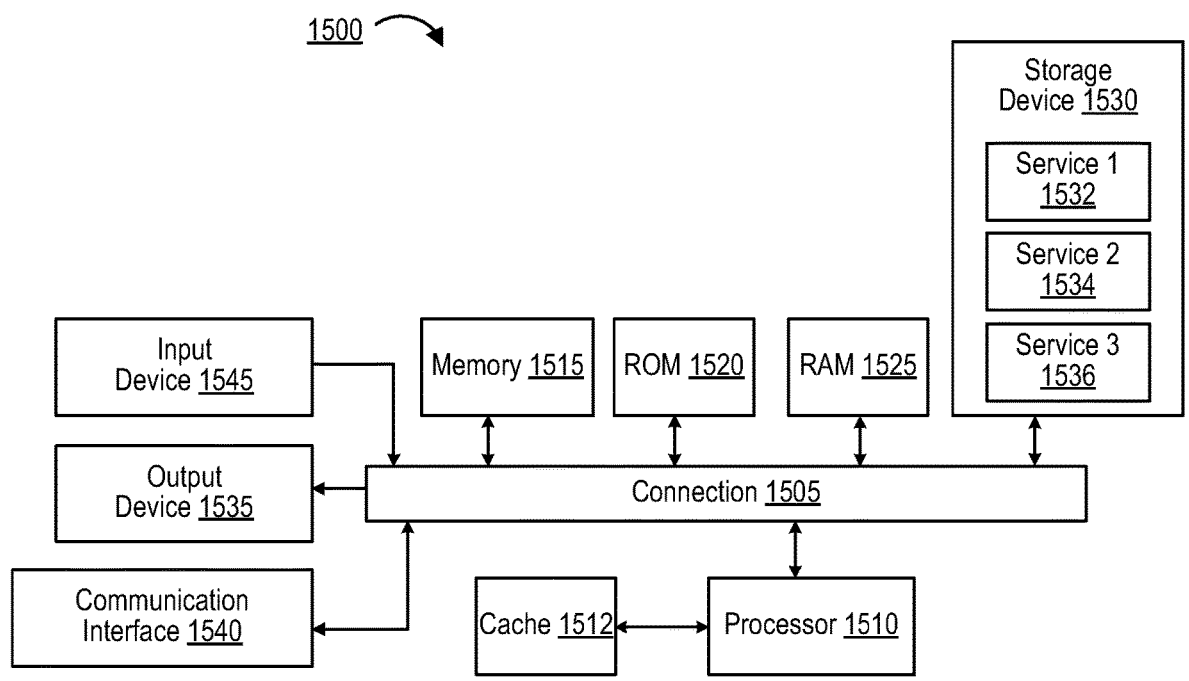
FIG. 15 is a block diagram of an exemplary computing device that may be used to implement some aspects of the subject technology.

FIG. 15 is a diagram illustrating an example of a system for implementing certain aspects of the present technology. In particular, FIG. 15 illustrates an example of computing system 1500, which can be for example any computing device making up internal computing system, a remote computing system, a camera, or any component thereof in which the components of the system are in communication with each other using connection 1505. Connection 1505 can be a physical connection using a bus, or a direct connection into processor 1510, such as in a chipset architecture. Connection 1505 can also be a virtual connection, networked connection, or logical connection.

In some embodiments, computing system 1500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1500 includes at least one processing unit (CPU or processor) 1510 and connection 1505 that couples various system components including system memory 1515, such as read-only memory (ROM) 1520 and random access memory (RAM) 1525 to processor 1510. Computing system 1500 can include a cache 1512 of high-speed memory connected directly with, in close proximity to, or integrated as part of processor 1510.

Processor 1510 can include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms. In some instances, multimodal systems can enable a user to provide multiple types of input/output to communicate with computing system 1500. Computing system 1500 can include communications interface 1540, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1530 can include software services, servers, services, etc., that when the code that defines such software is executed by the processor 1510, it causes the system to perform a function. In some embodiments, a hardware service that performs a particular function can include the software component stored in a computer-readable medium in connection with the necessary hardware components, such as processor 1510, connection 1505, output device 1535, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. A method of automated account interaction, the method comprising: receiving historical information associated with a first account corresponding to a first user, wherein the historical information identifies a transaction involving the first account; using one or more trained machine learning models to identify an intent for the transaction by inputting the historical information to the one or more trained machine learning models; using the one or more trained machine learning models to generate a recommended transaction by inputting the intent for the transaction to the one or more trained machine learning models; outputting the recommended transaction; receiving a confirmation regarding the recommended transaction; and based on the confirmation, using the intent and the recommended transaction to update the one or more trained machine learning models for use in identifying one or more additional intents and one or more additional recommended transactions.

Aspect 2. The method of Aspect 1, further comprising: automatically initiating execution of the recommended transaction on behalf of the first user in response to receipt of the confirmation.

Aspect 3. The method of Aspect 2, further comprising: automatically outputting a transaction completion confirmation in response to execution of the recommended transaction.

Aspect 4. The method of any of Aspects 1 to 3, further comprising: receiving second historical information associated with a second account, wherein identifying the intent for the transaction includes identifying a link between the first account and the second account, wherein identifying the intent for the transaction is also based on the second historical information.

Aspect 5. The method of Aspect 4, wherein the recommended transaction includes a recommendation to transfer one or more assets from the first account to the second account.

Aspect 6. The method of any of Aspects 4 to 5, wherein the recommended transaction includes a recommendation to transfer one or more assets from the second account to the first account.

Aspect 7. The method of any of Aspects 4 to 6, wherein the second account is associated with at least one of a merchant or a second user.

Aspect 8. The method of any of Aspects 4 to 7, wherein the recommended transaction is for at least one of a product and a service associated with the second account.

Aspect 9. The method of any of Aspects 1 to 8, wherein identifying the intent for the transaction includes identifying that the first user has operational access to a vehicle, wherein the transaction is for at least one of a product and a service associated with the vehicle, and wherein the recommended transaction is for at least one of a second product and a second service associated with the vehicle.

Aspect 10. The method of any of Aspects 1 to 9, wherein identifying the intent for the transaction includes identifying that the first user resides in a residence, wherein the transaction is for at least one of a product and a service associated with the residence, and wherein the recommended transaction is for at least one of a second product and a second service associated with the residence.

Aspect 11. The method of any of Aspects 1 to 10, wherein identifying the intent for the transaction includes identifying that the first user works in a profession, wherein the transaction is for at least one of a product and a service associated with the profession, and wherein the recommended transaction is for at least one of a second product and a second service associated with the profession.

Aspect 12. The method of any of Aspects 1 to 11, wherein identifying the intent for the transaction includes identifying that the first user has a relationship with a second user, wherein the transaction is for at least one of a product and a service associated with the second user, and wherein the recommended transaction is for at least one of a second product and a second service associated with the second user.

Aspect 13. The method of any of Aspects 1 to 12, further comprising: receiving additional information associated with the first account; and using one or more trained machine learning models to update the intent for the transaction based on the additional information.

Aspect 14. The method of Aspect 13, further comprising: in response to updating the intent, using one or more trained machine learning models to update the recommended transaction based on the intent.

Aspect 15. The method of any of Aspects 1 to 14, further comprising: receiving additional information associated with the first account; and using one or more trained machine learning models to update the recommended transaction based on the additional information.

Aspect 16. The method of any of Aspects 1 to 15, further comprising: receiving a question associated with the first user; determining an answer to the question based on at least one of the intent for the transaction or the recommended transaction; and outputting the answer to the question.

Aspect 17. The method of any of Aspects 1 to 16, further comprising: identifying that the first user is characterized by a characteristic based on the intent for the transaction, wherein using the one or more trained machine learning models to generate the recommended transaction includes inputting the characteristic to the one or more trained machine learning models.

Aspect 18. The method of any of Aspects 1 to 17, wherein outputting the recommended transaction includes sending a message identifying the recommended transaction to a user device associated with the first user, wherein receiving the confirmation regarding the recommended transaction includes receiving an approval to initiate the recommended transaction from a user device associated with the first user.

Aspect 19. The method of any of Aspects 1 to 18, wherein outputting the recommended transaction includes automatically initiating execution of the recommended transaction on behalf of the first user, wherein receiving the confirmation regarding the recommended transaction includes receiving a transaction completion confirmation indicating that the recommended transaction has been processed.

Aspect 20. The method of any of Aspects 1 to 19, further comprising: receiving feedback from a user device associated with the first user, wherein the feedback is associated with at least one of the intent for the transaction or the recommended transaction; and updating the one or more trained machine learning models by using the feedback as training data for the one or more trained machine learning models.

Aspect 21. The method of any of Aspects 1 to 20, wherein generating the recommended transaction includes determining an eligibility of the first user for a line of credit, wherein the recommended transaction includes a recommendation to open the line of credit for the first user based on the eligibility.

Aspect 22. The method of any of Aspects 1 to 21, wherein the recommended transaction includes a recommendation to make at least one of an appointment or a reservation with a service provider.

Aspect 23. The method of any of Aspects 1 to 22, wherein the one or more trained machine learning models include a first trained machine learning model and a second trained machine learning model, wherein using the one or more trained machine learning models to identify the intent for the transaction includes using the first trained machine learning model to identify the intent for the transaction by inputting the historical information to the first trained machine learning model, wherein using the one or more trained machine learning models to generate the recommended transaction includes using the second trained machine learning model to generate the recommended transaction by inputting the intent for the transaction to the second trained machine learning model.

Aspect 24. The method of any of Aspects 1 to 23, wherein the one or more trained machine learning models include a first trained machine learning model, wherein using the one or more trained machine learning models to identify the intent for the transaction includes using the first trained machine learning model to identify the intent for the transaction by inputting the historical information to the first trained machine learning model, wherein using the one or more trained machine learning models to generate the recommended transaction includes using the first trained machine learning model to generate the recommended transaction by inputting the intent for the transaction to the first trained machine learning model.

Aspect 25. The method of any of Aspects 1 to 24, wherein outputting the recommended transaction includes causing the recommended transaction to be displayed using a display.

Aspect 26. The method of any of Aspects 1 to 25, wherein outputting the recommended transaction includes causing the recommended transaction to be transmitted a user device associated with the first user via a communication transceiver.

Aspect 27. The method of any of Aspects 1 to 26, further comprising: receiving schedule information associated with the first user; and identifying a scheduled event based on the schedule information, wherein the recommended transaction is associated with the scheduled event.

Aspect 28. The method of any of Aspects 1 to 27, further comprising: generating one or more profiles associated with the user based on the intent for the transaction and one or more intents determined for one or more additional transactions, wherein each of the one or more profiles identifies one or more preferences of the user with respect a category of transactions of a set of different categories of transactions; wherein using the one or more trained machine learning models to generate the recommended transaction by inputting the intent for the transaction to the one or more trained machine learning models includes inputting at least one of the one or more profiles to the one or more trained machine learning models.

Aspect 29. The method of any of Aspects 1 to 28, further comprising: using the one or more trained machine learning models to select a recommended community from a plurality of communities by inputting the intent to the one or more trained machine learning models, wherein the recommended community is associated with the intent; outputting the recommended community.

Aspect 30. An apparatus for automated account interaction, the apparatus comprising: a memory; and one or more processors coupled to the memory, the one or more processors configured to: receive historical information associated with a first account corresponding to a first user, wherein the historical information identifies a transaction involving the first account; use one or more trained machine learning models to identify an intent for the transaction by inputting the historical information to the one or more trained machine learning models; use the one or more trained machine learning models to generate a recommended transaction by inputting the intent for the transaction to the one or more trained machine learning models; output the recommended transaction; receive a confirmation regarding the recommended transaction; and use, based on the confirmation, the intent and the recommended transaction to update the one or more trained machine learning models for use in identifying one or more additional intents and one or more additional recommended transactions.

Aspect 31. The apparatus of Aspect 30, further comprising any of Aspects 2-29.

Aspect 32. A non-transitory computer-readable medium having stored thereon instructions that, when executed by one or more processors, cause the one or more processors to perform operations according to any of Aspects 1-29.

Aspect 33. An apparatus for image processing, the apparatus comprising one or more means for performing operations according to any of Aspects 1-29.

What is claimed is:

1. A method of automated payment account interaction using a server, the method comprising:
    training a first neural network using a first training dataset associated with an account corresponding to a first user;
    training a second neural network using a second training dataset associated with the account corresponding to the first user;
    dynamically receiving historical information associated with the account corresponding to the first user;
    processing the historical information using a first neural network to identify an intent, wherein a first set of weights and a first set of connections of the first neural network contribute to the identification of the intent, wherein the intent continues to be updated in real-time as the historical information continues to be received, and wherein the intent relates to an asset associated with the first user;
    selecting a recommended second user for a communication with the first user based on the intent and an association between the recommended second user and the asset, wherein selecting includes processing the intent using a second neural network, wherein a second set of weights and a second set of connections of the second neural network contribute to the selection of the recommended second user;
    initiating a communication between the first user and the recommended second user, wherein the communication is related to the asset, and wherein the communication includes feedback; and
    retraining the first neural network using the feedback in real-time as the feedback is extracted from the communication, wherein retraining uses the feedback to modify the first set of weights to improve accuracy of the first neural network at identifying one or more additional intents, and wherein the modification strengthens or weakens the first set of weights based on whether the feedback is positive or negative.

2. The method of claim 1, further comprising:
    recommending a transaction associated with the communication, wherein the recommended transaction is based on the intent and the historical information; and
    automatically initiating processing of the recommended transaction on behalf of the first user.

3. The method of claim 2, further comprising:
    automatically outputting a transaction completion confirmation in response to processing of the recommended transaction.

4. The method of claim 1, further comprising:
    receiving second historical information associated with a second account, wherein the intent is based on a link between the account and the second account, and wherein the intent is based on the second historical information.

5. The method of claim 1, wherein initiating the communication includes initiating a transfer of one or more assets from the account to a second account associated with the recommended second user.

6. The method of claim 1, wherein initiating the communication includes initiating a transfer of one or more assets from a second account to the account, wherein the second account is associated with the recommended second user.

7. The method of claim 1, wherein the recommended second user is associated with at least one of a merchant or a customer service agent.

8. The method of claim 1, wherein the asset includes at least one of a product or a service associated with the first user.

9. The method of claim 1, wherein identifying the intent includes identifying that the first user has operational access to a vehicle, wherein the asset includes at least one of a product or a service associated with the vehicle, and wherein the recommended second user is selected based on knowledge associated with a vehicle type of the vehicle.

10. The method of claim 1, wherein identifying the intent includes identifying that the first user resides in a residence, wherein the asset includes at least one of a product or a service associated with the residence, and wherein the recommended second user is selected based on knowledge associated with a residence type of the residence.

11. The method of claim 1, wherein identifying the intent includes identifying that the first user works in a profession, wherein the asset includes at least one of a product or a service associated with the profession, and wherein the recommended second user is selected based on knowledge associated with the profession.

12. The method of claim 1, wherein identifying the intent includes identifying that the first user has a relationship with the recommended second user, wherein the asset includes at least one of a product or a service associated with the recommended second user.

13. The method of claim 1, further comprising:
    receiving additional information associated with the account; and
    using the first neural network to update the intent based on the additional information.

14. The method of claim 13, further comprising:
    in response to updating the intent, using at least one of the first neural network or the second neural network to update at least one of the intent or the recommended second user based on the intent.

15. The method of claim 1, further comprising:
    receiving additional information associated with the account; and
    using at least one of the first neural network or the second neural network to update at least one of the intent or the recommended second user based on the additional information.

16. The method of claim 1, further comprising:
receiving a question associated with the first user;
determining an answer to the question based on the intent; and
outputting the answer to the question.

17. The method of claim 1, further comprising:
identifying that the first user is characterized by a characteristic based on the intent, wherein using the second neural network to select the recommended second user includes inputting the characteristic into the second neural network.

18. The method of claim 1, further comprising:
sending a message identifying the communication to a user device associated with the first user, wherein initiating the communication is based on receiving an approval to initiate the communication from the user device associated with the first user.

19. The method of claim 1, wherein initiating the communication includes initiating a call between the first user and the recommended second user.

20. The method of claim 1, further comprising:
receiving the feedback from a user device associated with the first user, wherein the feedback is associated with at least one of the intent or the recommended second user; and
updating at least one of the first neural network or the second neural network by using the feedback as training data for the retraining.

21. The method of claim 2, wherein generating the recommended transaction includes determining an eligibility of the first user for a line of credit, wherein the recommended transaction includes a recommendation to open the line of credit for the first user based on the eligibility.

22. The method of claim 1, wherein initiating the communication includes creating at least one of an appointment or a reservation involving at least the first user and the recommended second user.

23. The method of claim 1, further comprising:
generating a recommendation for the communication between the first user and the recommended second user, wherein the recommendation for the communication is generated by processing the intent and the historical information using a third neural network.

24. The method of claim 1, wherein the historical information includes voice data associated with at least a voice of the first user.

25. The method of claim 1, further comprising:
causing a recommendation for the communication to be displayed using a display.

26. The method of claim 1, further comprising:
causing a recommendation for the communication to be transmitted to a user device associated with the first user.

27. The method of claim 1, further comprising:
receiving schedule information associated with the first user and schedule information associated with the recommended second user; and
identifying a scheduled event based on the schedule information associated with the first user and the schedule information associated with the recommended second user, wherein the the communication is associated with the scheduled event.

28. The method of claim 1, further comprising:
generating one or more profiles associated with the first user based on the intent and one or more additional intents determined for the first user based on the historical information, wherein each of the one or more profiles identifies one or more preferences of the first user with respect to a respective data category of a plurality of data categories, wherein the historical information is associated with the plurality of data categories;
wherein processing the intent using the second neural network to select the recommended second user includes processing the intent and information associated with at least one of the one or more profiles into the second neural network.

29. The method of claim 1, further comprising:
using the second neural network to select a recommended community from a plurality of communities by processing the intent to the second neural network, wherein the recommended community includes the recommended second user and is associated with the intent; and
outputting the recommended community.

30. An apparatus for automated account interaction, the apparatus comprising:
at least one memory; and
at least one processor coupled to the at least one memory, the at least one processor configured to:
train a first neural network using a first training dataset associated with an account corresponding to a first user;
train a second neural network using a second training dataset associated with the account corresponding to the first user;
dynamically receive historical information associated with the account corresponding to the first user;
process the historical information using a first neural network to identify an intent, wherein a first set of weights and a first set of connections of the first neural network contribute to the identification of the intent, wherein the intent continues to be updated in real-time as the historical information continues to be received, and wherein the intent relates to an asset associated with the first user;
select a recommended second user for a communication with the first user based on the intent and an association between the recommended second user and the asset, wherein selecting includes processing the intent using a second neural network, wherein a second set of weights and a second set of connections of the second neural network contribute to the selection of the recommended second user;
initiate a communication between the first user and the recommended second user, wherein the communication is related to the asset, and wherein the communication includes feedback; and
retrain the first neural network using the feedback in real-time as the feedback is extracted from the communication, wherein retraining uses the feedback to modify the first set of weights to improve accuracy of the first neural network at identifying one or more additional intents, and wherein the modification strengthens or weakens the first set of weights based on whether the feedback is positive or negative.

31. The apparatus of claim 30, wherein the at least one processor is configured to:
recommend a transaction associated with the communication, wherein the recommended transaction is based on the intent and the historical information; and
automatically initiate processing of the recommended transaction on behalf of the first user.

32. The apparatus of claim 31, wherein the at least one processor is configured to:
automatically output a transaction completion confirmation in response to processing of the recommended transaction.

33. The apparatus of claim 30, wherein the at least one processor is configured to:
receive second historical information associated with a second account, wherein the intent is based on a link between the account and the second account, and wherein the intent is based on the second historical information.

34. The apparatus of claim 30, wherein initiating the communication includes initiating a transfer of one or more assets from the account to a second account associated with the recommended second user.

35. The apparatus of claim 30, wherein initiating the communication includes initiating a transfer of one or more assets from a second account to the account, wherein the second account is associated with the recommended second user.

36. The apparatus of claim 30, wherein the recommended second user is associated with at least one of a merchant or a customer service agent.

37. The apparatus of claim 30, wherein the asset includes at least one of a product or a service associated with the first user.

38. The apparatus of claim 30, wherein identifying the intent includes identifying that the first user has operational access to a vehicle, wherein the asset includes at least one of a product or a service associated with the vehicle, and wherein the recommended second user is selected based on knowledge associated with a vehicle type of the vehicle.

39. The apparatus of claim 30, wherein identifying the intent includes identifying that the first user resides in a residence, wherein the asset includes at least one of a product or a service associated with the residence, and wherein the recommended second user is selected based on knowledge associated with a residence type of the residence.

40. The apparatus of claim 30, wherein identifying the intent includes identifying that the first user works in a profession, wherein the asset includes at least one of a product or a service associated with the profession, and wherein the recommended second user is selected based on knowledge associated with the profession.

41. The apparatus of claim 30, wherein identifying the intent includes identifying that the first user has a relationship with the recommended second user, wherein the asset includes at least one of a product or a service associated with the recommended second user.

42. The apparatus of claim 30, wherein the at least one processor is configured to:
receive additional information associated with the account; and
use the first neural network to update the intent based on the additional information.

43. The apparatus of claim 42, wherein the at least one processor is configured to:
in response to updating the intent, use at least one of the first neural network or the second neural network to update at least one of the intent or the recommended second user based on the intent.

44. The apparatus of claim 30, wherein the at least one processor is configured to:
receive additional information associated with the account; and
use at least one of the first neural network or the second neural network to update at least one of the intent or the recommended second user based on the additional information.

45. The apparatus of claim 30, wherein the at least one processor is configured to:
receive a question associated with the first user;
determine an answer to the question based on the intent; and
output the answer to the question.

46. The apparatus of claim 30, wherein the at least one processor is configured to:
identify that the first user is characterized by a characteristic based on the intent, wherein using the second neural network to select the recommended second user includes inputting the characteristic into the second neural network.

47. The apparatus of claim 30, wherein the at least one processor is configured to:
send a message identifying the communication to a user device associated with the first user, wherein initiating the communication is based on includes receiving an approval to initiate the communication from the user device associated with the first user.

48. The apparatus of claim 30, wherein initiating the communication includes initiating a call between the first user and the recommended second user.

49. The apparatus of claim 30, wherein the at least one processor is configured to:
receive the feedback from a user device associated with the first user, wherein the feedback is associated with at least one of the intent or the recommended second user; and
update at least one of the first neural network or the second neural network by using the feedback as training data for the training retraining.

50. The apparatus of claim 31, wherein generating the recommended transaction includes determining an eligibility of the first user for a line of credit, wherein the recommended transaction includes a recommendation to open the line of credit for the first user based on the eligibility.

51. The apparatus of claim 30, wherein initiating the communication includes creating at least one of an appointment or a reservation involving at least the first user and the recommended second user.

52. The apparatus of claim 30, wherein the at least one processor is configured to:
generate a recommendation for the communication between the first user and the recommended second user, wherein the recommendation for the communication is generated by processing the intent and the historical information using a third neural network.

53. The apparatus of claim 30, wherein the historical information includes voice data associated with at least a voice of the first user.

54. The apparatus of claim 30, wherein the at least one processor is configured to:
cause a recommendation for the communication to be displayed using a display.

55. The apparatus of claim 30, wherein the at least one processor is configured to:
cause a recommendation for the communication to be transmitted a user device associated with the first user.

56. The apparatus of claim 30, wherein the at least one processor is configured to:

receive schedule information associated with the first user and schedule information associated with the recommended second user; and identify a scheduled event based on the schedule information associated with the first user and the schedule information associated with the recommended second user, wherein the communication is associated with the scheduled event.

57. The apparatus of claim 30, wherein the at least one processor is configured to:

generate one or more profiles associated with the first user based on the intent and one or more additional intents determined for the first user based on the historical information, wherein each of the one or more profiles identifies one or more preferences of the first user with respect to a respective data category of a plurality of data categories, wherein the historical information is associated with the plurality of data categories;

wherein processing the intent using the second neural network to select the recommended second user includes processing the intent and information associated with at least one of the one or more profiles into the second neural network.

58. The apparatus of claim 30, wherein the at least one processor is configured to:

use the second neural network to select a recommended community from a plurality of communities by processing the intent to the second neural network, wherein the recommended community includes the recommended second user and is associated with the intent; and output the recommended community.

59. A non-transitory computer readable storage medium having embodied thereon a program, wherein the program is executable by a processor to perform a method of automated payment account interaction using a server, the method comprising:

training a first neural network using a first training dataset associated with an account corresponding to a first user;

training a second neural network using a second training dataset associated with the account corresponding to the first user;

dynamically receiving historical information associated with the account corresponding to the first user;

processing the historical information using a first trained neural network to identify an intent, wherein a first set of weights and a first set of connections of the first neural network contribute to the identification of the intent, wherein the intent continues to be updated in real-time as the historical information continues to be received, and wherein the intent relates to an asset associated with the first user;

selecting a recommended second user for a communication with the first user based on the intent and an association between the recommended second user and the asset, wherein selecting includes processing the intent using a second neural network, wherein a second set of weights and a second set of connections of the second neural network contribute to the selection of the recommended second user;

initiating a communication between the first user and the recommended second user, wherein the communication is related to the asset, and wherein the communication includes feedback; and retraining the first neural network using the feedback in real-time as the feedback is extracted from the communication, wherein retraining uses the feedback to modify the first set of weights to improve accuracy of the first neural network at identifying one or more additional intents, and wherein the modification strengthens or weakens the first set of weights based on whether the feedback is positive or negative.

60. The non-transitory computer readable storage medium of claim 59, the method further comprising:

recommending a transaction associated with the communication, wherein the recommended transaction is based on the intent and the historical information; and automatically initiating processing of the recommended transaction on behalf of the first user.

61. The non-transitory computer readable storage medium of claim 60, the method further comprising:

automatically outputting a transaction completion confirmation in response to processing of the recommended transaction.

62. The non-transitory computer readable storage medium of claim 59, the method further comprising:

receiving second historical information associated with a second account, wherein the intent is based on a link between the account and the second account, and wherein the intent is based on the second historical information.

63. The non-transitory computer readable storage medium of claim 59, wherein initiating the communication includes initiating a transfer of one or more assets from the account to a second account associated with the recommended second user.

64. The non-transitory computer readable storage medium of claim 59, wherein initiating the communication includes initiating a transfer of one or more assets from a second account to the account, wherein the second account is associated with the recommended second user.

65. The non-transitory computer readable storage medium of claim 59, wherein the recommended second user is associated with at least one of a merchant or a customer service agent.

66. The non-transitory computer readable storage medium of claim 59, wherein the asset includes at least one of a product or a service associated with the first user.

67. The non-transitory computer readable storage medium of claim 59, wherein identifying the intent includes identifying that the first user has operational access to a vehicle, wherein the asset includes at least one of a product or a service associated with the vehicle, and wherein the recommended second user is selected based on knowledge associated with a vehicle type of the vehicle.

68. The non-transitory computer readable storage medium of claim 59, wherein identifying the intent includes identifying that the first user resides in a residence, wherein the asset includes at least one of a product or a service associated with the residence, and wherein the recommended second user is selected based on knowledge associated with a residence type of the residence.

69. The non-transitory computer readable storage medium of claim 59, wherein identifying the intent includes identifying that the first user works in a profession, wherein the asset includes at least one of a product or a service associated with the profession, and wherein the recommended second user is selected based on knowledge associated with the profession.

70. The non-transitory computer readable storage medium of claim 59, wherein identifying the intent includes identifying that the first user has a relationship with the recommended second user, wherein the asset includes at least one of a product or a service associated with the recommended second user.

71. The non-transitory computer readable storage medium of claim 59, the method further comprising:
receiving additional information associated with the account; and
using the first neural network to update the intent based on the additional information.

72. The non-transitory computer readable storage medium of claim 71, the method further comprising:
in response to updating the intent, using at least one of the first neural network or the second neural network to update at least one of the intent or the recommended second user based on the intent.

73. The non-transitory computer readable storage medium of claim 59, the method further comprising:
receiving additional information associated with the account; and
using at least one of the first neural network or the second neural network to update at least one of the intent or the recommended second user based on the additional information.

74. The non-transitory computer readable storage medium of claim 59, the method further comprising:
receiving a question associated with the first user;
determining an answer to the question based on the intent; and
outputting the answer to the question.

75. The non-transitory computer readable storage medium of claim 59, the method further comprising:
identifying that the first user is characterized by a characteristic based on the intent, wherein using the second neural network to select the recommended second user includes inputting the characteristic into the second neural network.

76. The non-transitory computer readable storage medium of claim 59, the method further comprising:
sending a message identifying the communication to a user device associated with the first user, wherein initiating the communication is based on includes receiving an approval to initiate the communication from the user device associated with the first user.

77. The non-transitory computer readable storage medium of claim 59, wherein initiating the communication includes initiating a call between the first user and the recommended second user.

78. The non-transitory computer readable storage medium of claim 59, the method further comprising:
receiving the feedback from a user device associated with the first user, wherein the feedback is associated with at least one of the intent or the recommended second user; and
updating at least one of the first neural network or the second neural network by using the feedback as training data for the retraining.

79. The non-transitory computer readable storage medium of claim 60, wherein generating the recommended transaction includes determining an eligibility of the first user for a line of credit, wherein the recommended transaction includes a recommendation to open the line of credit for the first user based on the eligibility.

80. The non-transitory computer readable storage medium of claim 59, wherein initiating the communication includes creating at least one of an appointment or a reservation involving at least the first user and the recommended second user.

81. The non-transitory computer readable storage medium of claim 59, the method further comprising:
generating a recommendation for the communication between the first user and the recommended second user, wherein the recommendation for the communication is generated by processing the intent and the historical information using a third neural network.

82. The non-transitory computer readable storage medium of claim 59, wherein the historical information includes voice data associated with at least a voice of the first user.

83. The non-transitory computer readable storage medium of claim 59, the method further comprising:
causing a recommendation for the communication to be displayed using a display.

84. The non-transitory computer readable storage medium of claim 59, the method further comprising:
causing a recommendation for the communication to be transmitted to a user device associated with the first user.

85. The non-transitory computer readable storage medium of claim 59, the method further comprising:
receiving schedule information associated with the first user and schedule information associated with the recommended second user; and
identifying a scheduled event based on the schedule information associated with the first user and the schedule information associated with the recommended second user, wherein the communication is associated with the scheduled event.

86. The non-transitory computer readable storage medium of claim 59, the method further comprising:
generating one or more profiles associated with the first user based on the intent and one or more additional intents determined for the first user based on the historical information, wherein each of the one or more profiles identifies one or more preferences of the first user with respect to a respective data category of a plurality of data categories, wherein the historical information is associated with the plurality of data categories;
wherein processing the intent using the second neural network to select the recommended second user includes processing the intent and information associated with at least one of the one or more profiles into the second neural network.

87. The non-transitory computer readable storage medium of claim 59, the method further comprising:
using the second neural network to select a recommended community from a plurality of communities by processing the intent to the second neural network, wherein the recommended community includes the recommended second user and is associated with the intent; and
outputting the recommended community.

* * * * *